US007140044B2

United States Patent
Redlich et al.

(10) Patent No.: US 7,140,044 B2
(45) Date of Patent: *Nov. 21, 2006

(54) DATA SECURITY SYSTEM AND METHOD FOR SEPARATION OF USER COMMUNITIES

(75) Inventors: Ron M. Redlich, Miami Beach, FL (US); Martin A. Nemzow, Miami Beach, FL (US)

(73) Assignee: Digital Doors, Inc., Miami Beach, FL (US)

( * ) Notice: Subject to any disclaimer, the term of this patent is extended or adjusted under 35 U.S.C. 154(b) by 782 days.

This patent is subject to a terminal disclaimer.

(21) Appl. No.: 10/008,209

(22) Filed: Dec. 6, 2001

(65) Prior Publication Data

US 2002/0091975 A1    Jul. 11, 2002

Related U.S. Application Data

(63) Continuation-in-part of application No. 09/916,397, filed on Jul. 27, 2001.

(60) Provisional application No. 60/287,813, filed on May 2, 2001, provisional application No. 60/267,944, filed on Feb. 12, 2001, provisional application No. 60/260,398, filed on Jan. 9, 2001, provisional application No. 60/247,242, filed on Nov. 13, 2000, provisional application No. 60/247,232, filed on Nov. 13, 2000.

(51) Int. Cl.
*G06F 7/00* (2006.01)
*G06F 17/00* (2006.01)
*H04L 9/14* (2006.01)

(52) U.S. Cl. .................... 726/27; 713/166; 715/530; 715/751

(58) Field of Classification Search ................ 713/200, 713/201, 166; 715/751, 530; 726/27
See application file for complete search history.

(56) References Cited

U.S. PATENT DOCUMENTS 5,036,315 A * 7/1991 Gurley ........................ 715/733
5,485,474 A    1/1996 Rabin ........................ 371/37.1

(Continued)

OTHER PUBLICATIONS

Schneier, Bruce, Applied Cryptography, 1996, pp. 220, 228-229.*

(Continued)

*Primary Examiner*—Gilberto Barron
*Assistant Examiner*—Michael Pyzocha
(74) *Attorney, Agent, or Firm*—Robert C. Kain, Jr.; Fleit Kain

(57) ABSTRACT

Data is secured in a computer network to transparently establish and manage a separation of user-based communities of interest based upon crypto-graphically separated, need to know, security levels. Data from a source document, data object or data stream is filtered to form subsets of extracted data and remainder data based upon security levels for the communities. Extracts are stored in assigned memories. Full or partial plaintext reconstruction is permitted only in the presence of assigned security clearance for the community of the inquiring party. Encryption, corresponding to security levels, establishes separation of secured data. The information processing system uses a data filter to extract security sensitive words, data objects, etc., a distributed storage system and a compiler is used to reconstruct plaintext based on security clearance. Multiple level encryption in one document is also available.

73 Claims, 11 Drawing Sheets

U.S. PATENT DOCUMENTS

| | | | | |
|---|---|---|---|---|
| 5,532,950 | A | * | 7/1996 | Moses et al. ............... 708/322 |
| 5,581,682 | A | * | 12/1996 | Anderson et al. ........... 715/530 |
| 5,832,212 | A | | 11/1998 | Cragun et al. ......... 395/188.01 |
| 5,903,646 | A | * | 5/1999 | Rackman ..................... 705/51 |
| 5,905,980 | A | | 5/1999 | Masuichi et al. .............. 707/1 |
| 5,933,498 | A | * | 8/1999 | Schneck et al. .............. 705/54 |
| 5,960,080 | A | * | 9/1999 | Fahlman et al. ............ 380/252 |
| 5,996,011 | A | | 11/1999 | Humes ...................... 709/225 |
| 6,055,544 | A | | 4/2000 | DeRose et al. ............. 707/104 |
| 6,078,907 | A | * | 6/2000 | Lamm ......................... 705/40 |
| 6,094,483 | A | | 7/2000 | Fridrich et al. ............... 380/28 |
| 6,148,342 | A | | 11/2000 | Ho .............................. 709/225 |
| 6,192,472 | B1 | | 2/2001 | Garay et al. ................ 713/165 |
| 6,301,668 | B1 | | 10/2001 | Gleichauf ................... 713/201 |
| 6,389,542 | B1 | * | 5/2002 | Flyntz .......................... 726/17 |
| 6,487,538 | B1 | | 11/2002 | Gupta .......................... 705/24 |
| 6,598,161 | B1 | | 7/2003 | Kluttz ........................ 713/166 |
| 6,602,298 | B1 | | 8/2003 | Kirshenbaum ........... 715/502.2 |
| 6,714,977 | B1 | | 3/2004 | Fowler ....................... 709/224 |
| 6,771,290 | B1 | | 8/2004 | Hoyle ........................ 345/745 |
| 2002/0116641 | A1 | | 8/2002 | Mastrianni ................. 713/201 |
| 2004/0054630 | A1 | | 3/2004 | Ginter ......................... 705/53 |

OTHER PUBLICATIONS

FOLDOC, "URL," Feb. 17, 2000, pp. 1-2.*
Ingram i100, Content Security Appliance (2 pages).
Element-Wise XML Encryption, Hiroshi Maruyama and Takeshi Imamura, IBM Research, Tokyo Research Laboratory (4 pages).
Survival Information Storage Systems by Jay J. Wylie, Michael W. Bigrigg, John D. Strunk, Gregory R. Ganger, Han Kiliccote Pradeep K. Khosla (8 pages).
ZD Net Interactive iWeek—IBS, SAP: XML to Boost Security Integration ( 1 page).
Myers, A.C. "Mostly-Static Decentralized Information Flow Control" M.I.T. Doctoral Thesis Jan. 1999.
Cisco Systems' Intrusion Detection System (IDS) Host Sensor 2.0 product data sheet and technical overview, 10 pgs., Jul. 3, 2000, www.cisco.com.
The 1996 book, Applied Cryptography, by Schneier.
The Uniform Resource Locator article "FOLD OC".
Wylie "Survival Information Storage Systems".
Microsoft Word "Learning Microsoft Word 7.0".

* cited by examiner

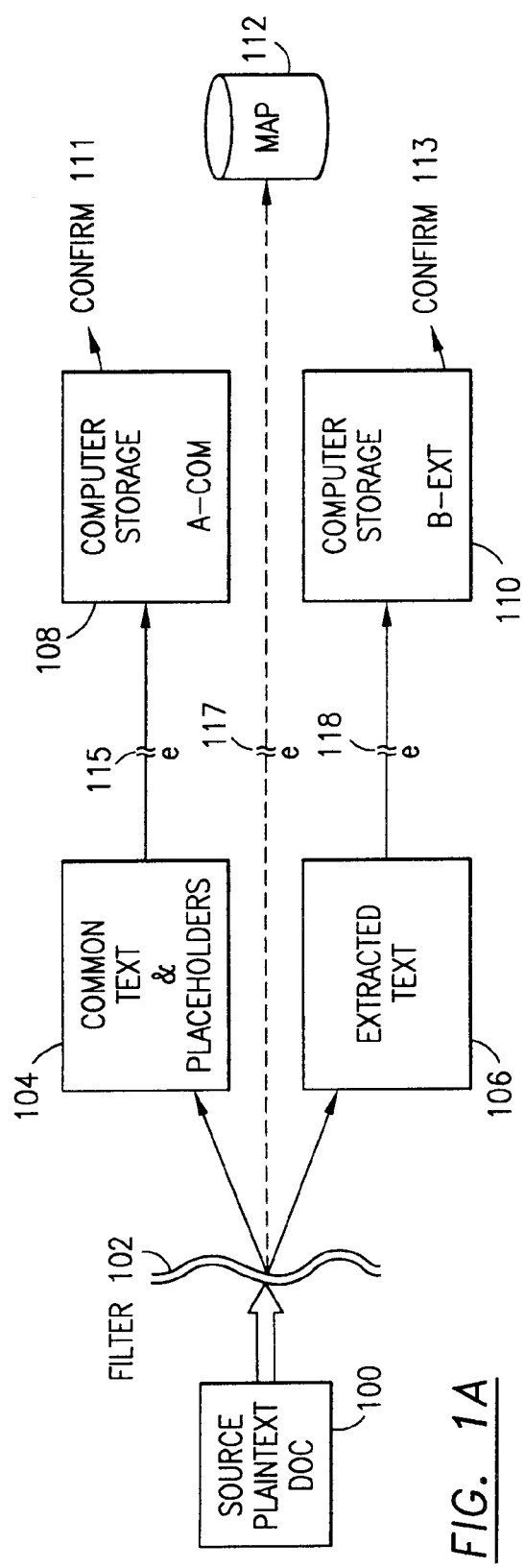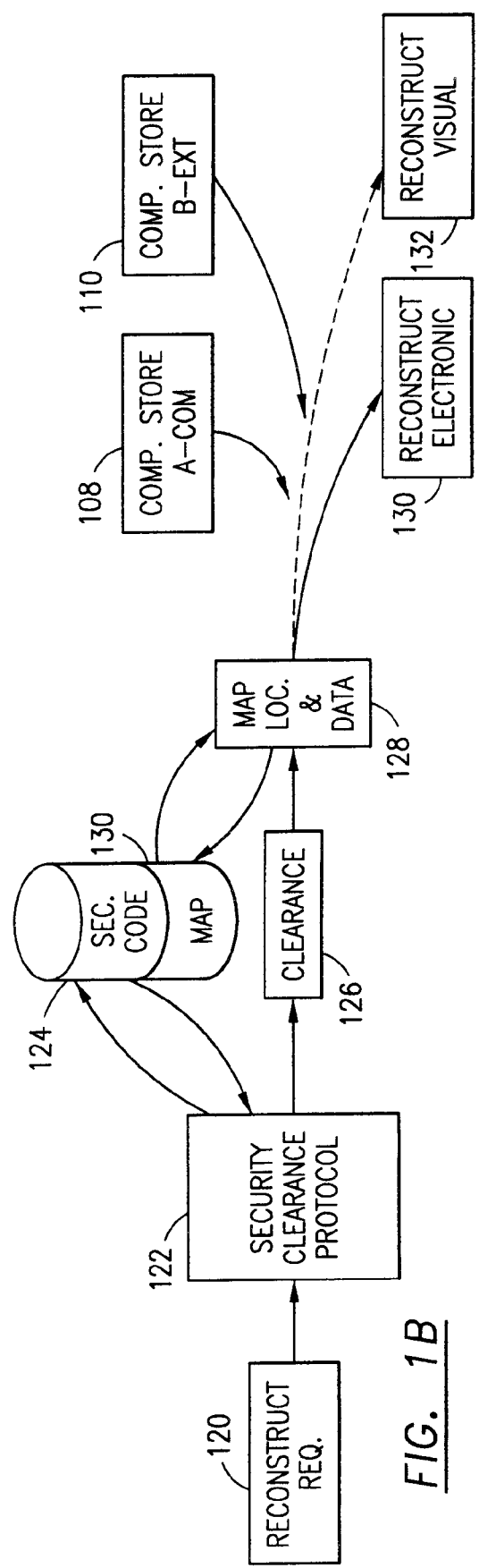
FIG. 1A
FIG. 1B

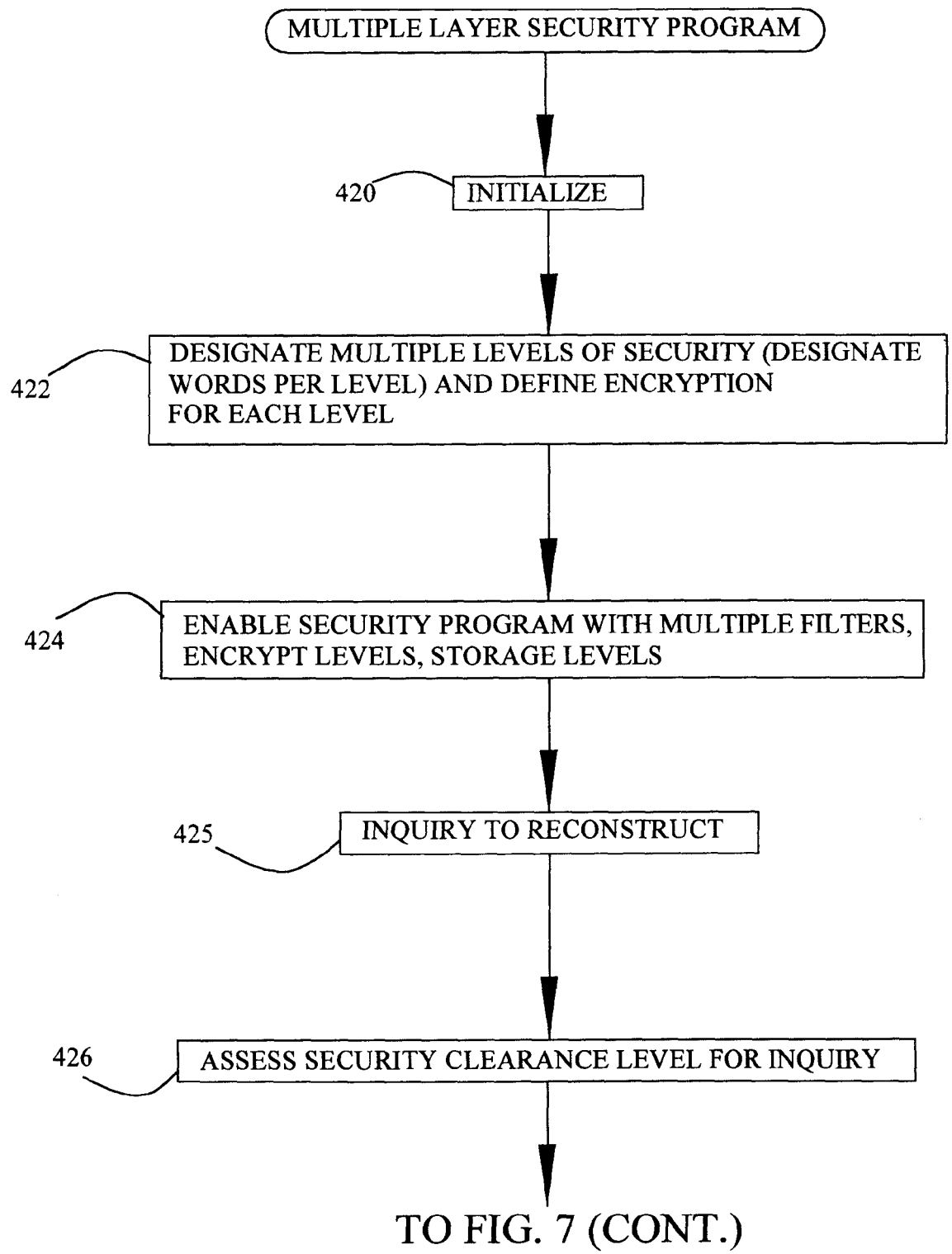

US 7,140,044 B2

DATA SECURITY SYSTEM AND METHOD FOR SEPARATION OF USER COMMUNITIES

This is a continuation-in-part of patent application Ser. No. 09/916,397 filed Jul. 27, 2001 which is a regular patent application is based upon provisional patent application No. 60/260,398, filed Jan. 9, 2001; application No. 60/287,813, filed on May, 2, 2001; application No. 60/267,944, filed Feb. 12, 2001; application No. 60/247,242, filed Nov. 13, 2000 and application No. 60/247,232, filed Nov. 13, 2000.

The present invention relates to a data security system and method and, more specifically, the filtering, extraction and controlled release of data utilizing security protocols to establish and manage the separation of user-based communities of interest based upon crypto-graphically separated, need to know, security levels.

BACKGROUND OF THE INVENTION

The extensive use of computers and the continued expansion of telecommunications networks, particularly the Internet, enable businesses, governments and individuals to create documents (whether text, images, data streams or a combination thereof, sometimes identified as "data objects") and distribute those documents widely to others. Although the production, distribution and publication of documents is generally beneficial to society, there is a need to limit the distribution and publication of security sensitive words, characters or icons. Concerns regarding the privacy of certain data (for example, an individual's social security number, credit history, medical history, business trade secrets and financial data) is an important issue in society. In another words, individuals and businesses have a greater concern regarding maintaining the secrecy of certain information in view of the increasing ease of distribution of documents through computer networks and the Internet.

U.S. Pat. No. 6,055,544 to DeRose et al. discloses the generation of chunks of a long document for an electronic book system. DeRose '544 discloses solutions available to book publishers to publish books in electronic format on the worldwide web. One of the problems is that the books are published as small document fragments rather than publishing an entire book which, due to the formatting, protocol and command structure on the Internet, downloads an entire book to the user. The problem involved with publishing small documents is that there is no relationship to other portions of the book. See col. 3, lines 51–55 and col. 4, lines 3–5. One methodology to solve the problem involves inserting hypertext links in the book. This places a large burden on the book publisher. Col. 4, lines 19–21. Accordingly, it is an object of DeRose '544 to provide a mechanism for accessing only a portion of a large, electronically published document and automatically determining what portion of the document to download to the user based upon user selections that is, previous portions and subsequent portions of the document are downloaded with the selected portion, without maintaining separate data files for each portion of the document. Col. 4, lines 34–39. In other words, if a person wanted to access chapter 4 of a text, the system in DeRose '544 would display chapter 4, chapter 3 (the preceding chapter) and chapter 5 (the subsequent chapter). This publishing of portions of the document utilizes a subset of marked up elements established as being significant and a second subset of elements being less significant. For example, "Title elements" define a table of contents. A first representation of the document structure defined by all of the marked up elements may be used in combination with a second representation of the document structure defined only by the significant elements to control selection of portions of the documents such that previous and subsequent portions may be selected and rendered in a consistent and intuitive manner." Col. 4, lines 38–55. A computer system stores a first representation of the hierarchy of all elements in the electronic document. As example, this may be each chapter in its entirety. The computer also stores a second representation of the hierarchy of only significant elements in the electronic document. As an example, this may be a listing of each chapter without the text associated with the chapter. In response to request for a portion of the document, the computer system selects the portion defined by the significant element in the second representation. For example, if the user requested chapter 4, the entirety of chapter 4 would be downloaded from the web server to the client computer. In addition to rendering or publishing the selected chapter, the computer system looks to the relationship of the elements in the first representation of the hierarchy (the list of all chapters) and downloads from the web server the adjacent chapters. In this example, this would involve downloading chapters 3 and chapter 5. In a further embodiment, the computer system selects only a leaf element of the second representation as a significant element during the download. See the Summary of the Invention, col. 4, line 40 through col. 6, line 14.

U.S. Pat. No. 5,832,212 to Cragun et al. discloses a censoring browser method for viewing downloaded and downloading Internet documents. The abstract describes the system as including a user profile including user selected censoring parameters. Data packet contents are received from the Internet and the packets are compared with the user selected censoring parameters. Responsive to the comparison, the received data packet contents are processed and selectively displayed. The user selected censoring parameters include censored words and word fragments, and user selected categories. Compared word and word fragments can be removed and selectively replaced with predefined characters or acceptable substitute words. Tallies of weights for user selected categories are accumulated and compared with used selected threshold values. A predefined message can be displayed responsive to an accumulated tally exceeding a user selected threshold value without displaying the received data packet contents.

U.S. Pat. No. 6,094,483 to Fridrich discloses an encryption methodology hiding data and messages in images. In one application of the system in Fridrich '483, a method is disclosed of embedding a secret digital square image with 256 gray levels within an image carrier. The secret image is first encrypted using a chaotic Baker map. The resulting image is a random collection of pixels with randomly distributed gray levels without any spatial correlations. The carrier image is twice the size (height and width or 2n×2m) the secret image with 256 gray levels. The carrier image is modified according to a mathematical formula.

U.S. Pat. No.5,485,474 to Rabin discloses a scheme for information dispersal and reconstruction. Information to be transmitted or stored is represented as N elements of a field or a computational structure. These N characters of information are grouped into a set of n pieces, each containing m characters. col. 1, lines 37–46. The system is used for fault tolerance storage in a partitioned or distributed memory system. Information is disbursed into n pieces so that any m pieces suffice for reconstruction. The pieces are stored in different parts of the memory storage medium. A fairly complex mathematical algorithm is utilized to provide reconstruction of the information utilizing no fewer than m pieces.

U.S. Pat. No. 6,192,472 B1 to Garay et al. discloses a method and apparatus for the secure distributed storage and retrieval of information. Garay '472 identifies the problem as how to store information in view of random hardware or telecommunications failures. Col. 1, lines 17–20. The initial solution is to replicate the stored data in multiple locations. Col. 1, lines 28–31. Another solution is to disburse the information utilizing in Information Disbursal Algorithm (IDA). The basic approach taking in IDA is to distribute the information F being stored among n active processors in such a way that the retrieval of F is possible even in the presence of up to t failed (inactive) processors. Col. 1, lines 40–44. Another issue is the utilization of cryptographic tools. With the use of tools called distributed fingerprints (hashes), the stored data is distributed using the fingerprints and coding functions to determine errors. In this way, the correct processors are able to reconstruct the fingerprint using the code's decoding function, check whether the pieces of the file F were correctly returned, and finally reconstruct F from the correct pieces using the IDA algorithm. Col. 2, lines 50–59. Garay '472 also discloses the use of Secure Storage and Retrieval of Information (SSRI) with the added requirement of confidentiality of information. Col. 3, line 56. With this added requirement, any collision of up to t processors (except ones including the rightful owner of the information) should not be able to learn anything about the information. Confidentiality of information is easily achieved by encryption. Col. 3, lines 56–61. The issue involves encryption key management, that is, the safe deposit of cryptographic keys. Garay '472 discloses confidentiality protocol utilizing distributed key management features. This mechanism allows the user to keep his or her decryption key shared among several n servers in such a way that when the user wants to decrypt a given encrypted text, the user would have to interact with a single server (the gateway) to obtain the matching plaintext while none of the servers (including the gateway) gets any information about the plaintext. Col. 4, lines 5–14.

U.S. Pat. No. 5,996,011 to Humes discloses a system and a method for filtering data received over the Internet by a client computer. The system restricts access to objectionable or target data received by a client computer over an Internet by a web server by filtering objectionable data from the data received. The Humes '011 system filters the data "on the fly." Further, the Humes '011 system can be applied to process any type of target data from the data received and displayed to the user. Col. 2, lines 32–44. If the web page requested by the user contains only a minimum amount of objectionable or target data, the user receives only a portion of the filtered web page for viewing. Hume '011 also provides that if the web page contains a large amount of objectionable material, the system blocks the entire display of the web page on the user's computer monitor. Col. 2, lines 56–62. Hume '011 provides three levels of filtering. At the first level, if the domain name contains objectionable words or material, the initial download from the domain is blocked. At the second level, the text in the download is filtered and objectionable words are replaced with a predetermined icon, for example, "----". Col. 3, lines 32–35. The filter uses a dictionary. Col. 3, lines 45–48. The filtered out words are counted. If the final score of "filtered out" material exceeds a predetermined threshold, the entire page is blocked from the user's view. Col. 4, lines 2–4.

U.S. Pat. No. 5,905,980 to Masuichi, et al., discloses a document processing apparatus for processing various types of documents, a word extracting apparatus for extracting a word from a text item including plural words, a word extracting method used in the document processing apparatus, and a storage medium for storing a word extracting program. Extracted words are associated with other words via an algorithm. The extracted words and associated words are used as a search index for the document.

U.S. Pat. No. 5,996,011 to Humes discloses a computer based system and method for filtering data received by a computer system, and in particular, for filtering text data from World Wide Web pages received by a computer connected to the Internet, for purposes of restricting access to objectionable web sites.

U.S. Pat. No. 6,148,342 to Ho discloses a system for managing sensitive data. The system prevents a system administrator from accessing sensitive data by storing data and identifier information on different computer systems. Each query from a user's terminal is encrypted using two codes, the first code readable only by an identifier database and a second code readable only by a data access database. The data is routed from the user's source terminal to the identifier database at the first computer. The first computer/identifier database first verifies the user's ID and the security clearance for the requested information and substitutes a second internal ID to the data packet/query. The modified query is then presented to the data access database (the second computer) and, subject to a second security clearance, the response to the data query is sent back to the user's source terminal.

A publication entitled "Element-Wise XML Encryption" by H. Maruyama T. Imamura, published by IBM Research, Tokyo Research Laboratory, Apr. 20, 2000 discloses a protocol or process wherein certain parts of an XML document are encrypted and the balance of the plaintext is not encrypted. The protocol is useful in three party transactions, for example, when a buyer sends an order in an XML document to a merchant which contains the buyer's credit card information. The credit card information is sent to a credit company and the merchant does not need to know the credit number as long as he obtains clearance or authorization from the credit card company. Another instance is an access control policy which requires a certain part of an XML document to be readable only by a privileged user (for example, a manager could access the salary field in an employee records but others could only access name, phone and office fields). The Imamura article discusses encryption protocol, the delivery of keys and the utilization of compression. The article does not discuss separate storage of the critical data apart from the plaintext of the XML document.

The Ingrain i100 Content Security Appliance product brochure, available in June, 2001, discloses a system coupled to multiple web servers (computers) to accelerate secured transactions between multiple client computers (over the Internet) and prevents Secure Sockets Layer SSL performance bottlenecks by performing high-performance SSL handshakes and encrypting all data sent to back end servers using long-lived SSL session.

An article entitled "Survivable Information Storage Systems" by J. Wylie M. Bigrigg, J. Strunk, G. Ganger, H. Kiliccote, and P. Khosla, published August, 2000 in COMPUTER, pp. 61–67, discloses a PASIS architecture which combines decentralized storage system technologies, data redundancy and encoding and dynamic self-maintenance to create survivable information storage. The Bigrigg article states that to achieve survivability, storage systems must be decentralized and must spread information among independent storage nodes. The decentralized storage systems partition information among nodes using data distribution and redundancy schemes commonly associated with disc array system such as RAID (redundancy array of independent discs) insuring scalable performance for tolerance. P. 61. Thresholding schemes—also known as secret sharing schemes or information disbursal protocols—offer an alternative to these approaches which provide both information confidentiality and availability. These schemes and codes, replicate, and divide information to multiple pieces or shares that can be stored at different storage nodes. The system can only reconstruct the information when enough shares are available. P. 62. The PASIS architecture combines decentralized storage systems, data redundancy and encoding and dynamic self-maintenance to achieve survivable information storage. The PASIS system uses threshold schemes to spread information across a decentralized collection of storage nodes. Client-side agents communicate with the collection of storage node to read and write information, hiding decentralization from the client system. P. 62. The device maintains unscrubable audit logs—that is, they cannot be erased by client-side intruders—security personal can use the logs to partially identify the propagation of intruder-tainted information around the system. P. 63. The article states that, as with any distributed storage system, PASIS requires a mechanism that translates object names—for example file names—to storage locations. A directory service maps the names of information objects stored in a PASIS system to the names of the shares that comprised the information object. A share's name has two parts: the name of the storage node on which the share is located and the local name of the share on the storage node. A PASIS file system can embed the information needed for this translation in directory entries. P. 63. To service a read request, the PASIS call client (a) looks up in the directory service the names of the n shares that comprise the object; (b) sends read requests to at least m of the n storage nodes; (c) collects the responses and continues to collect the responses until the client has collected m distinct shares; and (d) performs the appropriate threshold operation on the received shares to reconstruct the original information. P. 63. The p-m-n general threshold scheme breaks information into n shares so that (a) every shareholder has one of the n shares; (b) any m of the shareholders can reconstruct the information; and (c) a group of fewer than p shareholders gains no information. P. 64. Secret-sharing schemes are m-m-n threshold schemes that trade off information confidentiality and information availability: the higher the confidentiality guaranty, the more shares are required to reconstruct the original information object. Secret sharing schemes can be thought of as a combination of splitting and replication techniques. P. 64. The article discusses the technique of decimation which divides information objects into n pieces and stores each piece separately. Decimation decreases information availability because all shares must be available. It offers no information theoretic confidentiality because each share expresses 1/n of the original information. P. 64. Short secret sharing encrypts the original information with a random key, stores the encryption key using secret sharing, and stores the encrypted information using information disbursal. P. 64. An extension to the threshold schemes is cheater detection. In a threshold scheme that provides cheater detection, shares are constructed in such a fashion that a client reconstructing the original information object can tell, with high probability, whether any shares have been modified. This technique allows strong information integrity guarantees. Cheater detection can also be implemented using cryptographic techniques such as adding digest to information before storing it. P. 65. For the highest architecture to be effective as possible, it must make the full flexibility of threshold schemes available to clients. The article believes this option requires automated selection of appropriate threshold schemes on a per object basis. This selection would combine object characteristics and observations about the current system environment. For example, a client would use short secret sharing protocol to store an object larger than a particular size and conventional secret sharing protocol to store smaller objects. The size that determines which threshold scheme to use could be a function of object type, current system performance, or both. P. 67.

OBJECTS OF THE INVENTION

It is an object of the present invention to provide a data security system, an information processing system and a method for securely storing data and rebuilding that data in the presence of an adequate security clearance.

It is another object of the present invention to provide a method for securing data on a single personal computer (PC), on a plurality of computers linked together through a local area network (LAN) or a wide area network (WAN) or the Internet.

It is a further object of the present invention to provide a method for securing data utilizing a client-server computer system. The client-server computer system may be implemented over the Internet. The security system may be provided to the public, to government or to private entities as an Application Service Provider or ASP over the Internet.

It is a further object of the present invention to provide a method for securing data which is highly flexible and programmable by a user.

It is an additional object of the present invention to enable the user to establish (a) the scope of the security sensitive words, characters or icon, data objects, (b) the future use (or destruction or encryption) of a filter enabling extraction of security sensitive data, (c) the selection of storage locations (local, removable, in an LAN, a WAN or on the Internet) for extracted data and remainder or common data and (d) one or multiple levels of security limiting full reconstruction and enabling partial reconstruction of the extracted data and the remainder or common data.

It is another object of the present invention to establish and manage the separation of user-based communities of interest based upon crypto-graphically separated, need to know security levels.

It is another object to provide an adaptive system responsive to hacking attempts and hacking attacks.

These steps may be completely automated (after some parameters are set or programmed by a system administrator), may be fully programmable by the user, or may be a combination of automated and manual controls implemented by the systems administrator and/or the user-client.

SUMMARY OF THE INVENTION

The method for securing data in a computer system includes establishing a group of security sensitive words, characters, icons, data streams or data objects, filtering the data input from a data input device and extracting the security sensitive data. The extracted data is separated from the remainder data and is separately stored. In one embodiment on a personal computer (PC) system, the extracted data and the remainder or common data is stored in different, distributed memory segments. In a network implementation, the extracted data may be stored in one computer and the remainder or common data may be stored in another computer. In a client-server implementation, the server may direct storage of the extracted data to a different location than the remainder data, either on the server or on a further memory system (computer) interconnected to the server or on the client computer and in distributed memory segments. A map may be generated by a software module or subsystem indicating the location of the extracted data and the remainder data in the network. The filter may be destroyed (via a deletion routine) or may be retained for future use by the user. If retained, encryption is preferred. The map may be stored on the client computer or the user's PC or may be stored on the server. Copies of the map may be removed (deleted) from the user's PC or the client computer. The map may be encrypted. The extracted data and/or the remainder data may be removed (deleted or scrubbed) from the originating computer. Encryption can be utilized to further enhance the security levels of the system. All transfers of the filter between the client to the server may be encrypted, and all data (whether extracted data or remainder data) may be encrypted prior to storage in the distributed memory. Any transfer of extracted data or remainder data or maps or filters may include an encryption feature. Reconstruction of the data is permitted only in the presence of a predetermined security clearance. A plurality of security clearances might be required which would enable a corresponding plurality of reconstructing users to view all or portions of the data. Persons with low level security clearance would only be permitted to have access to low level extracted data (low level security sensitive data) and the common data. Persons with high level security clearances would be permitted access to the entire document reconstituted from the extracted data and the remainder data. A computer readable medium containing programming instructions carrying out the methodology for securing data is also described herein. An information processing system for securing data is also described.

The method for securing data in a computer network and transparently establishing and managing the separation of user-based communities of interest based upon cryptographically separated, need to know, security levels, by necessity, utilizes communities of interest representing a plurality of users having corresponding similar security levels, each with a respective security clearance. In other words, all members of Community A have the same security level and security clearance, which is different than the users of Community B which have a different security level and security clearance. The method and the computer media containing programming instructions includes filtering data from the data input computer, extracting security sensitive words, phrases, characters, icons, or data objects and forming subsets of extracted data and remainder data. The subsets of extracted data are stored in one or more computer memories in the network identified as extracted stores. The remainder data is also stored in the network if necessary. Reconstruction of some or all of the data via one or more of the subsets of extracted data and the remainder data is permitted only in the presence of a predetermined security clearance from the plurality of security levels. The cryptographically separated, need to know, security levels correspond to respective ones of the plurality of security levels and the method includes, in one embodiment, encrypting subsets of extracted data with corresponding degrees of encryption associated with the plurality of security levels. During reconstruction, all or a portion of the plaintext data is decrypted only in the presence of the respective security level. The information processing system which secures data per the community of interest security level in the includes a data filter for the data input from the data input computer which extracts the security sensitive words, phrases, icons or data objects. A system and a methodology for storing the subsets of extracted data and remainder data is provided and a compiler permits reconstruction of some or all of the plain text data in the presence of an appropriate security clearance level. Multiple level encryption in one document is also available.

The adaptive method of securing data against a plurality of hacking events utilizes a hacking monitor which generates a corresponding plurality of hack warnings dependent upon the severity of the hacking attack. Based upon respective ones of the hacking or hack warnings, data is filtered to extract security sensitive words, phrases etc. and the extracted data and the remainder data (if necessary) is stored based on the degree of hack warning. Reconstruction is permitted of some or all the data utilizing the extracted data and the remainder data only in the presence of the predetermined security clearance level. Automatic reconstruction is permitted after the hack attack terminates. The method sometimes includes encrypting extracted data dependent upon the degree or severity of the hack warning and decrypting that data during reconstruction. A computer readable medium containing programming instructions similar to the method is also provided. The information processing system includes a filter which is adjusted based upon the degree of hack warning to extract security sensitive words. A storage system stores extracted data and remainder data (if necessary) based upon the level of the hack warning and a compiler is used to reconstruct the data in the presence of the appropriate security clearance level.

The present invention can be configured in various forms. The following descriptions discuss various aspects of the invention and further advantages thereof.

The present invention enables automatic classification and declassification of documents on the fly. The extraction process downgrades and declassifies documents on the fly (in real time) so that they are useless to unauthorized parties. Presentation by a user of a valid security clearance enables substantially instant and seamless reconstitution of the security sensitive content.

The present invention automatically secures unstructured documents and freeform documents for example, e-mail, instant messaging, or Word documents (input documents).

The present invention automatically secures structured documents and transactional documents for example, database records or XML documents (input documents).

The present invention introduces flexibility into security management, risk management of data, data storage, and data flows and enable automatic responsiveness to threats. The innovation enables automatic response to security challenges and threats. The innovation can maintain, upgrade and downgrade the levels of security through implementation of a leveled granular extraction process and a controlled-release mechanism. Attacks or other external events can trigger a response in the form of higher extraction levels, expanding the type of content extracted, and constricting the release of important and critical data control from storage. How much and what to extract depends on the level of threat or perceived risk. In same manner, the amount and type of content released from storage and reconstituted depends on the level of threat or risk perceived by the system. The system delivers a level of security protection specifically matched to meet security needs as dictated by the changing security threats, environment, policy and organizational needs.

The present invention introduces multiple levels and standards of security. It is common knowledge that the highest security is delivered through total separation. Whereas this concept has only been implemented physically or by isolating computer environments, the invention achieves this concept of total separation within open and networked computer environments. The invention can implement a total physical and logical separation of important and critical data from its context and can preclude access to that information without a needed granular access permission. The invention is also effective for sounds and images (data objects or data streams with security words, characters, terms, icons or other data objects).

The present invention introduces a new method and apparatus to monitor security sensitive content through a process of analysis and categorization of each word or character, in a document. The invention enables processing of every character, word, number, as they are entered into a document and categorizes each into one of many pre-set categories. Categories can include surnames, locations, currency, defined terminology, and unknown words or phrases.

The present invention introduces a method and apparatus for plain text extraction and dispersion of security sensitive data. Maximum security with traditional methods encumbers free flow of information and business efficiency. Encryption burdens computer systems with high performance overhead, and its use is limited to the parties who have decryption capabilities. The invention offers a new solution. It enables leveled security in plain-text format, in addition to none, some, or all of pre-existing encryption, decryption, firewalls, and other security infrastructure. The level of security is determined by the extent of the security sensitive items, selection process; the extent of dispersal to various distributed storage locations; the rules for controlled-release from storage; and the access rules governing the reconstitution of extracts into the secured document.

The extractions are dispersed to distributed storage on a granular level. The rest of the document can be stored at its original location and/or other storage locations. Dispersal of extractions introduces new barriers not existing in current security. In certain situations, an attacker has first to find the (encrypted) map to the locations, then locate and access the distributed storage, get the data released from the controlled-release storage, and finally reintegrate the extracts into the appropriate documents.

The present invention introduces a method and apparatus for targeted extraction and encryption of security sensitive items. The extraction capabilities of the system enable different workflow modes. The system enables extraction and encryption of important and critical content. In essence, only the critical content is extracted and/or encrypted, whereas the rest of the document remains as plaintext. This capability enables the following: advantages and flexibility; and the ability to share the document within the organization or transmit it to outsiders while still maintaining security over the most important and critical content of the document. This is an automatic process for controlling the content of outgoing e-mail. The document owner releases the important and critical content by enabling access to it to defined parties at defined times within defined threat modes.

The present invention introduces a method and apparatus for encrypting document or extractions with multiple encryption types. The invention can deliver the highest level of security by using multiple types of encryption (and/or multiple keys) for one line, paragraph or document. Maximum security is delivered through automatic selection of security sensitive items, and encrypting these extractions with one or more types of encryption. The remainder data can also be encrypted. Multiple encryption types within one document statistically precludes deciphering that document regardless of the available computer power. Common encryption methods are vulnerable through existing technologies, social engineering methods, carelessness, and workflow habits. Furthermore, simple encryption becomes more vulnerable (including triple DES) assuming future mathematical breakthroughs or quantum computing. Existing methods to crack block ciphers are being improved to compromise the future AES Rinjdael standard.

The present invention to introduce a method and apparatus for content dispersion. The innovation enables control over specific important and critical content items within the general contents of documents or digital files in a computer or within a network. The immediate controlled-release of those important content items according to specific identification and access criteria proactively safeguards the security and the value of documents or digital files. The content control enables broad dissemination of the digital files in closed networks, as well as open networks including the Internet, without compromising the security of the important and critical information in the digital file. The dispersal channels can include any of all of the following: networks, Internet, Virtual Private Channel. Telephone lines, Optical lines, Wireless, Fax, Documents, Verbal communication.

The present invention introduces a method and apparatus for enhancing the survivability capabilities of an organization and its networks. If networks get damaged, the decryption capability, such as PKI, is likely to be compromised, or at a minimum, suspended. In such instances, the invention enables continuation of work on channels, which need not be secure. In addition, the dispersion of information guarantees maximum partial reconstitution to documents and transactions, or total reconstitution to documents and transactions benefiting from backup at distributed storage facilities.

The present invention introduces a method and apparatus for delivering security for inter-connecting networks. It enables security for closed networks connecting to the Internet and other open networks. The Internet infrastructure and open networks are not secure. Even secured closed networks, such as VPNs, are not secured enough. The critical content of documents is the critical asset of the organization and must be highly secured, with maximum reliability, full transparency and instant accessibility. To remain competitive, organizations must maximize utility of the critical data within their documents, files, databases and servers. The securing of such documents must not be at the expense of compromising the access or processing speed of such documents. The invention enables work in plain text, as well as with encryption. Working in plain text reduces the computing performance overload.

The present invention introduces a method and apparatus for delivering information flow control in decentralized environments. Protection of privacy and confidentiality of information represents a long-standing challenge, The challenge has become much bigger with the expansion of the Internet, which has created decentralized networks. Parties, who do not know or trust each other, have to exchange information. The invention enables free flow and sharing of information between parties by removing burdening security restrictions and creating top security with a controlled-release of the security sensitive content in the documents.

The technology enables top security through introduction of user and organization's ownership and control of the critical granular data in documents.

The system introduces an additional layer of access controls at the granular level of the user document. In order to view the reconstructed critical information the user would need to be verified by additional access controls at the data storage level. The user access code or a physical key enables release of data from the storage. Today's access controls do not stop the user from distributing documents to other parties. The inventions fined grained controlled-release mechanism releases the critical information, only under a required set of circumstances and access validation. The invention enables the user ownership of his security sensitive critical data and conditions for its release and dissemination. The user has the option to hide the critical data through declassification process and release through a reclassification process in which the critical data would be reconstituted in the document.

The present invention introduces a method and apparatus for delivering Compartmentalization of security sensitive content by leveled access to users. The invention creates leveled sharing of information, for example such that persons with level 3 access will have keys for encryption type RSA persons with level access 2 will have access to Blowfish encryption within one document.

The present invention introduces a method and apparatus for enabling more use of distributed and dispersed storage including ASPs (application service providers). There is a major human tendency to refrain from sending important documents to web storage locations because of potential security breaches. This cultural issue is both driven by psychological issues and well-founded security concerns. The retention of those documents as is in physical proximity or locked security, provides actual security but precludes gaining any utility from those documents in a functional business setting. Instead the invention enables functional distribution of those documents without the security sensitive data, and a controlled-release of some or all of the extractions in a granular way in order to support business activities while retaining security.

The present invention introduces a method and apparatus for enabling lower storage costs. The extraction process declassifies and downgrades mission critical documents. The downgrading and transformation of a critical document into a non-critical document, enables storage in less secured and lower cost storage. Taking advantage of this security-initiated, extraction process can yield substantial storage cost savings. The invention enables a high return on investment ROI for system storage cost arbitrage. Splitting the data into critical and non-critical enables 20 to 90% savings on storage cost.

The present invention delivers an automated security risk management system that creates added in-depth security defenses at the semantic-level as well as creation of controlled-release mechanisms at the storage-level with significantly reduced performance overhead requirements.

The present invention presents a technology which answers the security demands as required by Committee on Information Systems Trustworthiness of the National Research Council. The Committee's report, Trust in Cyberspace (1999), defines the security paradigms needed for a safe future. The report states: The substantial commercial off-the-shelf (COTS) makeup of a network information systems, the use of extensible components, the expectation of growth by accretion, and the likely absence of centralized control, trust, or authority demand a new approach to security: risk mitigation rather than risk avoidance; technologies to hinder attacks, rather than prevent them outright; add-on technologies and defense in depth; relocation of vulnerabilities rather than their elimination; none of the existing or security technologies addresses these needs in whole. The invention breakthroughs this barrier by providing a single system which implements each one of those four elements in a unified way. The invention controls information flow in centralized and decentralized environments, through controlled-release of information within distributed systems.

The present invention implements security measures while accommodating the performance needs of a network. The invention provides a method and apparatus to ease overhead performance on congested computer networks. It can adjust the security defenses based on the performance needs of the network. Many security systems overburden the already burdened computing environment in terms of computational overhead, labor, and training requirements. The invention enables to ease the overhead performance of a network by transforming from high overhead performance, encryption methods, and other security methods, to the method presented by this invention.

The present invention minimizes the time of exposure of the important content within a document. The invention enables to separate the important content from the rest of the document for substantial periods of time, thereby minimizing substantially the exposure to risk. It is possible for example to extract the important content from the document and release it for reconstitution only when the user will open the document. In such situations the important content could for example be time and unexposed for over 99% of the time and exposed for less than 1% of the time, which lowers the risk substantially.

The present invention provides a security risk management method and system to minimize security risks. The invention enables minimization of security risks by: Automatic separation and extraction of granular critical data from the core document. Dispersal of the extracted critical data groups to different secured storage locations. Reconstitution of the critical data in document for limited time, to minimize exposure to risk. Partial reconstitution, of the critical data, in core document, through a controlled release of granular critical data. Granular controlled release of data to specific authorized people only.

The present invention provides a controlled release security mechanism to enable the release of content and granular content from storage locations in a centralized and decentralized environment. The controlled release mechanism enables release of the appropriate content to the authorized party at the right time under the right circumstances.

The present invention provides a security solution against damage by insiders. Studies show that insiders cause 70%–85% of the damage. These nine innovations are described in detail as follows: The invention enables insiders and employees to work with documents while managers and owners control the release of the critical prioritized information. The control is granular, thereby enabling continued work with the rest of the content in the document. The objective is to empower the user with the highest security while enabling him maximum sharing and delivery flexibility. This enables free flow of information between closed networks and public networks, such as the Internet, without compromising the security through extraction of important and critical content. The user can transport documents through various networks and e-mail services knowing that the critical information, which is still under control, and is not compromised.

The present invention provides an automatic security system in order to overcome human flaws that create security vulnerabilities. Human engineering flaws are the cause of 90% of security vulnerabilities. For example, passwords are exposed through human fault enabling reading of plain text before it is encrypted. The invention enables an automatic process of appropriate response to security threats in an objective way and on an on going basis.

The present invention provides an automatic security system in order to reduce human labor, and training costs.

The present invention provides protection for important granular content within a document. A feature left out in computer development is the protection and automatic protection of granular important content in a document. In every facet of life critical assets are immediately protected. For example, credit cards and cash are protected in a wallet, important items at home are placed in closets, wall units, cabinets and safes. The present system extracts the digital equivalent of these items, e.g., extracts all credit card data, and stores the extracted data in secure location(s).

The present invention provides an alternative method to encryption. Mathematical security and encryption could be broken. Discovery of a mathematical equation for a shortcut of the factoring of prime numbers would be make mathematical security and encryption extremely vulnerable.

In 1999 a 512-bit RSA key was broken- at that time 95% of keys in e-commerce were 512 bits long. U.S. government 56-bit Data Encryption Standard was cracked in just 22 hours by the Freedom Foundation. 100,000 PCs were connected with a supercomputer which enabled the testing of 245 billion keys per second.

The invention provides an automated security risk management system. The system automatically responds to attacks by matching the defenses level to the level of threats The system responds to security threats through the following mechanisms: (1) controlled extraction of sensitive security data: in normal circumstances, extractions will take place according to pre-set rules; in threat situations, additional extractions will take place to deliver higher security; in an attack, additional substantial amounts of critical data will be extracted to deliver the highest security; (2) controlled dispersal to storage locations; in normal circumstances, dispersal to different storage locations according to pre-set rules will take place; in threat and attack situations, more dispersal to more storage locations, via additional communication channels will take place; and (3) controlled release of extracts for reconstitution; controlling amount of extracts released for reconstitution; controlling time of exposure of extracts in reconstitution; limiting access to specific people; and limiting access to specific times.

The present invention defends against devices like keyboard sniffers and mouse sniffers that can read information keyed into the computer and transmit it to an adversary. The invention enables to input security sensitive items through data input devices other than the keyboard. For example credit card numbers can be inputted through a hand held wireless devise. The inputted data would be transferred to storage for possible reconstitution.

The present invention defends against as devices that intercept electromagnetic signals from computers, monitors, printers, and keyboards. For example the Van Eck receptors which can read information off the screen the display screen. The invention enables separation contents of document into two or more displays thereby limiting the potential damage of electromagnetic eavesdropping.

The present invention enables the controlled release of data objects, full or partial release of plaintext source documents to persons or organizations with the appropriate security clearances.

Another object of the present invention is to enable the control of information flow over a PC, a network, a LAN, a WAN and over the Internet.

A further object of the present invention is to enable the interoperability of several secured networks based upon the relative security clearances of each network.

It is another object of the present invention to provide a process for synthesizing a document.

BRIEF DESCRIPTION OF THE DRAWINGS

Further objects and advantages of the present invention can be found in the detailed description of the preferred embodiments when taken in conjunction with the accompanying drawings in which:

FIG. 1A diagrammatically illustrates a basic system diagram showing filtering and storing extracted data and remainder or common data and, in an enhanced embodiment, generating and storing a map.

FIG. 1B diagrammatically illustrates a system diagram showing reconstruction of the data, various security clearances and both electronic reconstruction and visual reconstruction.

FIG. 3A diagrammatically illustrates interleaving distinct data into different memory locations in a video memory.

DETAILED DESCRIPTION OF THE PREFERRED EMBODIMENTS

Figure 2:
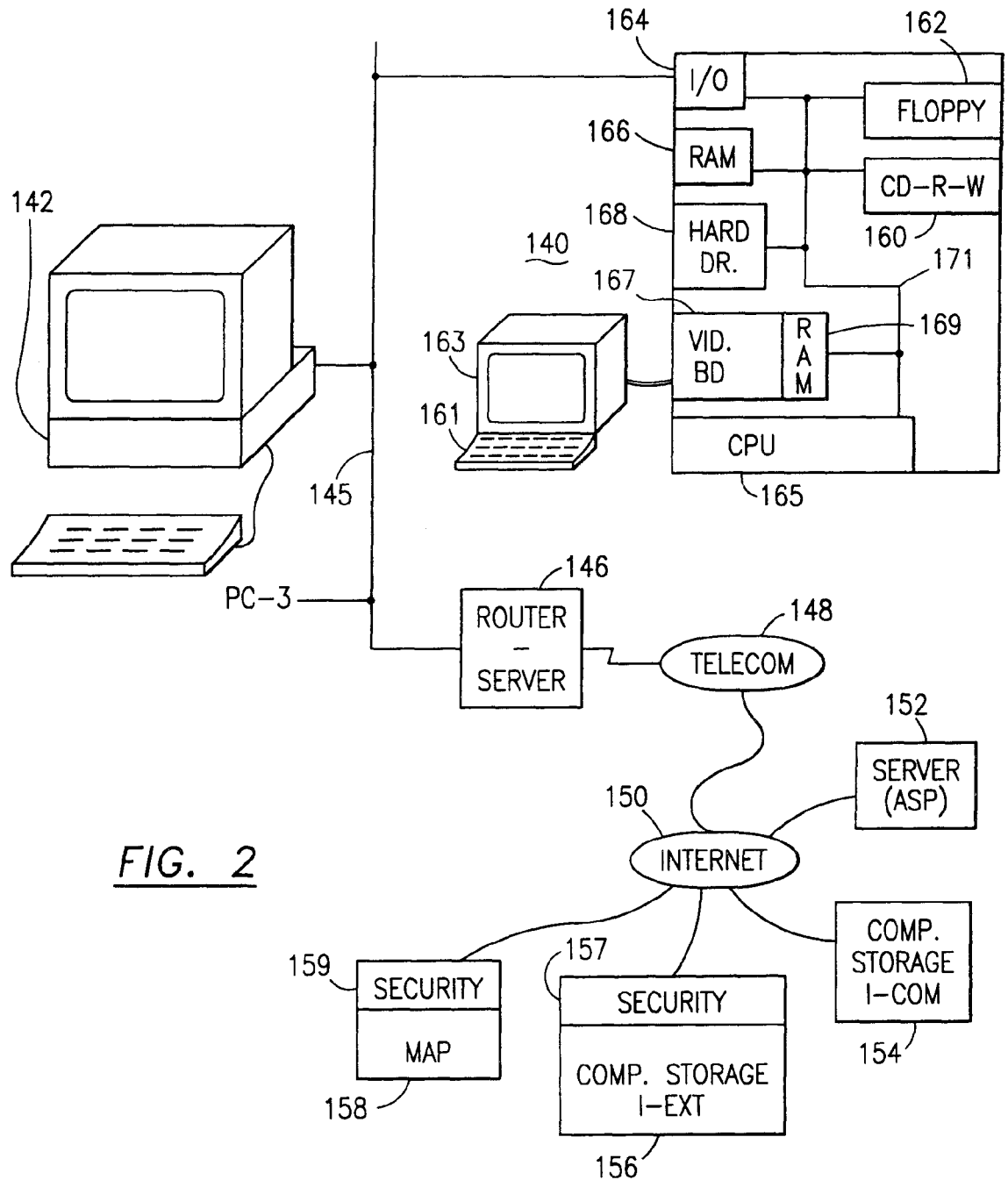
FIG. 2 diagrammatically illustrates a system showing major components of a single personal computer (PC) system, a networked system with several PCs (a LAN or WAN) and the network coupled to a telecommunications system and the Internet and shows the interconnection with a server and multiple, Internet-connected memory units.

The present invention relates to a data security system, a methodology of securing data on a personal computer (PC) system, on a computer network (LAN or WAN) and over the Internet and computer programs and computer modules and an information processing system to accomplish this security system.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
|---|---|
| A-com | computer or memory store for common or remainder data |
| B-ext | computer or memory store for extracted data |
| bd | board |
| CD-RW | compact disk drive with read/write feature for CD disk |
| comm. | communications, typically telecommunications |
| CPU | central processing unit |
| doc | document |
| dr | drive, e.g., computer hard drive |
| e | encryption |
| ext-data | extracted data |
| I/O | input/output |
| I-com | Internet storage for common or remainder data |
| I-ext | Internet storage for extracted data |
| loc | location |
| mem | memory |
| obj | object, for example, a data object |
| pgm | program |
| re | regarding or relating to |
| recon | reconstruct |
| rel | release |
| req | request |
| rev | review |
| sec | security |
| sys | system |
| t | time |
| tele-com | telecommunications system or network |
| URL | Uniform Resource Locator, x pointer, or other network locator |

FIG. 1A diagrammatically illustrates the basic processes for establishing a secure storage of information, generally identified herein as "data." "Data," as used herein, includes any data object, e.g., text, images, icons, moving images, multiple images, data representing sound, video etc. Sound bites and video images may also be extracted data. A source document 100, sometimes referred to as a "plaintext," is passed through a filter 102. Although it is convenient to discuss and understand the invention herein in connection with a plaintext document, the document 100 is a data object. It is not limited to an electronic document representing words. The document 100 represents a data object that may be e.g., text, images, icons, moving images, multiple images, data representing sound, video etc. The term "data object" as used in the claims is broadly defined as any items that can be represented in an electronic format such that the electronic format can be manipulated by a computer as described herein. The data object, or as discussed herein, the "plaintext" is sent to a filter. Filter 102, in a most basic sense, separates out common text or remainder data 104 from uncommon text, words, characters, icons or data objects. The security sensitive words, characters, icons or data objects are separated from remainder or common text 104 as extracted text 106. It should be noted that although the word "text" is utilized with respect to remainder text 104 and extracted text 106, the text is a data object and includes words, phrases, paragraphs, single characters, portions of words, characters, whole or partial images, icons or data objects. In a basic implementation, filter 102 may utilize a dictionary such that words present in the dictionary (common words) are separated from the source plaintext document 100 and placed into remainder document or common data file 104. The uncommon words (extracted-security sensitive words), not found in the dictionary, would be placed in an extracted text or extracted data file 106. For example, a business may wish to impose a security system on a contract document such that the names of the contracting parties (not found in the dictionary) and the street names (not found in the dictionary) would be stored in extracted data text file 106. The common text or remainder data would be stored in remainder data file 104. In the illustrated embodiment, remainder data file 104 also includes place holders which enables the extracted data to be easily inserted or set back into the remainder data file.

The security sensitive words, characters, icons or data objects may be any word, phrase, letter, character, icon, data object (full or partial), image or whatever as pre-defined or as established by the user. The user may specifically design the filter, begin with a dictionary to define common terms, identify any additional security sensitive words, letters, images, icon, data objects, partial versions of the foregoing or any other granular aspect of the plaintext. After defining the filter and accepting the data input, the system filters the plaintext and separates extracted data (security sensitive items) from the remainder data. The filter may also include elements of artificial intelligence (AI). For example, the user may select one word as a security word and the AI filter may automatically select all synonymous words. The AI filter may enable the user to define a filter is real time at the entry of data via a keyboard. For example, the user may select to secure (i.e., extract and store) some proper names and may instruct the filter to secure names such as Block, Smythe and Cherry. During input of the plaintext, the system may detect Smith and ask the user if he or she wants to secure (a) all proper names in a common name dictionary collection and/or (b) all names with spellings similar to the filter input data, Block, Smythe and Cherry. As is known in the art, AI typically uses inference engines to define one pathway or to outline a course of action. The filter or extraction engine discussed herein can be configured with AI, inference engines, neural network systems or other automatic systems to carry out the functionality described herein for the dynamic operation of the security system.

The system and methodology described herein also encompasses parsing the plain text document by bit count, word, word count, page count, line count, paragraph count and parsing based upon any identifiable document characteristic, capital letters, italics, underline, etc. Algorithms may be implemented to parse the plain text document. The target of the parsing algorithm (a bit count, word, letter, etc.) is equivalent to the "security word, character or icon, data object" discussed herein. The parsing occurs with the filtering of the plain text source document 100 and the subsequent storage of extracted data apart from remainder data.

In a basic configuration, the common text or the remainder data is stored in common storage memory 108. This common or remainder data store is identified as A-com generally referring to a segmented memory in a PC or a computer A in a network (LAN or WAN). Remainder data storage 108 may include a confirm storage signal function 111 to send back a confirm storage signal to the data input device generating source plaintext document 100. The extracted data file 106 is stored in a different memory computer storage 110 (B-ext). In a preferred embodiment, memory segment 108 (A-com) is at a different location than computer storage memory segment 110 (B-ext). In a PC embodiment, memory A-com is a different memory segment than memory B-ext. In a networked embodiment, computer storage 108 may be on a different computer as compared with computer storage 110. In an Internet embodiment, common text or cleansed text storage is at one web site (which may be one computer) and the extracted, high security data is stored at another web site, buried web page or other Internet-accessible memory store location. In any event, the remainder text is stored in a memory A-com and the extracted data or high security words, characters, icons or data objects are stored in memory B-ext. After storage of the extracted data in memory 110, a confirmation indicator 113 may be generated to the client computer or the computer handling source plaintext input document 100 (the originating computer system).

As a simple example, the program configured in accordance with the present invention, could automatically detect entry of all credit card numbers types into a user's computer. The filter is set to detect the unique credit card sequence and data string. Assuming that the user's computer is operating a browser and the user is communicating with a server on the Internet, the user's computer would filter out the credit card number and send the number to a secure storage site. The secure storage site is owned, operated or leased by a trusted party. The extracted data, i.e., the credit card data, is stored at the trusted site. The URL or other identifying data is sent to the vendor from which the user wants to purchase goods and services over the Internet. When the vendor seeks to complete the transaction, the vendor sends a request code to the secure site, the trusted party at the secure extracted data storage site debits the user's credit card account (or otherwise debits the user's bank account) and sends an approval code to the vendor. In this manner, the vendor is never given the user's credit card—the card number is sent to a trusted party automatically by the filter in the security program described herein. The security program may be incorporated in a browser to automatically protect credit card data, personal data (as a method to become anonymous on the Internet), etc. from being deliberately broadcast to others on the Internet or to block others from snooping into the user's personal data while the user communicates over the Internet.

In a further enhancement of the present invention, the computer or data input device handling source plaintext document 100 may also record the location of A-com 108 and B-ext 110. The location data is called herein a "map." A memory mapping function is utilized. The map may be stored in a third memory location 112. Memory location map 112 may be a segment of the memory of the data input computer originating plaintext 100. The map may be encrypted for security reasons.

As a further enhancement of the present invention, the user, prior to initiating the security system, may be given a choice of filtering out all the uncommon words or words not found in the dictionary and adding certain security sensitive words, characters, icons or data objects to filter 102. The added words or terms are filtered out with the uncommon words. Of course, the user may be required to manually input all security words or download the security word filter from the Internet or another system on the LAN. For security systems having multiple security levels, a plurality of filters would be created, each filter associated with a different security level. Further, multiple security levels would require, in addition to remainder text document or data 104, a plurality of extracted data documents 106. The common or remainder text document or data 104 bike would still be stored in remainder computer storage A-com 108. However, each extracted data document 106 would be stored in a respective, separate computer memory segment or computer B-ext 110. Separate storage of a plurality of extracted data at multiple, separate locations in B-ext is one of the many important features of the present invention.

In view of increasing levels of security relating to (a) the storage location A-com; (b) the transfer of remainder text document 104 to memory computer storage A-com 108; (c) the storage of map 112 (possibly encrypted); (d) the creation, storage or transfer of filter 102 (possibly encrypted); (e) the storage of extracted data at memory storage B-ext (whether singular or plural storage sites); and (f) the transfer of extracted data thereto, the system may include an encryption e feature. The encryption e function 115, 117 and 118 is diagrammatically illustrated in FIG. 1A.

The program of the present invention can be set to extract critical data (a) when the plaintext or the source document (data object) is created; (b) when the source document or data object is saved; (c) on a periodic basis; (d) automatically; (e) per user command; (f) per ascertainable or programmable event; and (g) a combination of the foregoing. Timing for storage of the extracted data is based on these aspects. Reconstruction of the data object or plaintext may be (a) automatic and substantially transparent to the user; (b) based upon manual entry of security clearance data; (c) periodic; or (d) a combination of the foregoing dependent upon outside events and who is the author of the data object or other definable aspects of the data object, its environment of origination, current and anticipated security threats and its environment of proposed reconstruction. The timing for the extraction, storage and reconstruction is oftentimes dependent upon the level of security required by the user and/or his or her organization.

FIG. 1B generally diagrammatically illustrates the major features of a reconstruction routine or system. The user, typically at a computer terminal, inputs a reconstruction request 120. The system first executes a security clearance protocol routine 122 in order to determine whether the user has the proper security clearance. The security clearance may be thought of as a security clearance control. If multiple users are permitted access to the documents and those multiple users have different security clearances, the security clearance protocol determines the level of security clearance and, hence, the full or partial reconstruction of the plaintext. The security code input by the user is checked against a security code database or list 124. Clearance is provided in step 126. The location of the map and, hence, the location of the remainder data A-com 108 and extraction is provided to the user's computer in step 128. This may include obtaining a copy of the map 130 showing the location of memory segments in (a) the local computer; (b) the LAN or WAN; or (c) the Internet storage sites. The storage segments are A-com 108 and B-ext 110. The common or remainder data is downloaded or transferred or made available to the user's computer as shown at the output of map location and data step 128. Typically, the extracted or security sensitive data from B-ext is downloaded. As described hereinafter, the data can be reconstructed as a complete electronic document in function 130 or may be reconstructed only as a visual reconstruction in step 132. Visual reconstruction is discussed later. Function 130 operates as a compiler to gather the extracted data and remainder data into a single plaintext document. If the data object represents sound or audio signals, reconstruction and play back may require a speaker output in function block 130.

If remainder data in A-com memory 108 and extracted data in B-ext computer memory 110 is encrypted, the reconstruction process includes a decryption step. Encryptors and decryptors are relatively well known by persons of ordinary skill in the art. Further, the filter 102 (FIG. 1A) may include some encryption routine operating on the data object (plaintext) during the filtering. A simple encryption may include substituting "dummy" text or images for the security words and keeping a pointer to an encryption key document mapping the security words with the dummy words. The filter may be stored or may be destroyed at the option of the user. Storage of the filter impacts the degree of security of the entire data system but storage of the same filter enables the user to reuse the filter at a later time. Encryption of the stored filter increases the security of the data. Creation and storage of map in memory 112 also impacts the degree of security of the system. However, if the filter 102 is destroyed and all copies of the map are destroyed on the user's computer originating plaintext document data 100, and the map is stored offsite in a third computer memory location 112, this offsite map storage may enhance the degree of security of the data. The originating computer processing plaintext 100 may be scrubbed to remove all reference and copies of the plaintext, remainder text, extracted data map storage data, etc., i.e., a deletion routine may be employed on the data input computer.

FIG. 2 diagrammatically illustrates a personal computer or PC computer system 140, a second PC or computer 142, and a third PC-3. PCs 140, 142 and PC-3 are connected together via a network 145 (LAN or WAN) and are also connected to an input/output device 146 that may be generally described as a router or a server to an outside communications system. The input/output device 146 is connected to a telecommunications system 148 which leads to Internet 150. The Internet is a global computer network. Internet 150 is coupled to a plurality of servers, one of which is server 152. Server 152 may be designated as an application service processor ASP. Internet 150 also includes various computer memory storage devices such as computer storage I-com 154, computer storage I-ext 156 and computer storage map 158. Computer storage enabling the store of extracted data includes a security level clearance module 157. Similarly, map computer storage 158 includes security level clearance module 159.

As stated earlier, the present data security system can be implemented on a single personal computer 140. In this case, different memory segments or hard drive 168 may be used for A-com and B-ext. Typically, PCs include a keyboard or data input device 161, a display 163, a central processing unit CPU 165, a video board 167 having video board memory 169, a fixed disc hard drive 168, a RAM 166, and input/output device 164, a removable memory media floppy drive 162 and a removable compact disk (CD) read-write (CD-RW) device or drive 160. The system may include other removable disk drives, tape drives, or flash memory units. Internal units CPU 165, video board 167, hard drive 168, RAM 166 input/output device 164, floppy drive 162 and CD-ROM device 160 are all coupled together via an internal bus 171. Bus 171 represents a plurality of buses as is known to persons of ordinary skill in the art.

One methodology of implementing the present invention utilizes distinct memory segments which may be designated in one or more of the following: hard drive 168, memory in a removable disk in floppy drive 162, memory in a removable CD disc in CD-RW device 160, and, to a very limited extend, RAM 166. In this manner, the user may select, generally at the outset of the process, that the extracted data memory storage B-ext 110 be stored on a floppy (removable memory) via floppy drive 162 or a CD via CD-RW drive 160. The user can then simply remove the floppy or the CD and carry it with him or her. To reconstruct the data, the operative program, generally discussed above would have access to the floppy or the CD and particularly the memory location of the data on the floppy and the CD in order to reconstruct the entire plaintext document 100 (see FIG. 1A). Alternatively, different portions of hard drive 168 may store A-com and B-ext. Of course, the computer system may utilize tape drives and memories or flash card, programmable memory.

In a local area network or wide area network implementation, PC 142 includes memory similar to memory units described in PC 140 and a memory segment may be set aside in PC 142 separate from the common data or remainder data storage typically placed on hard drive 168 in PC 140. As a further expansion of the present invention, the extracted data (that is, the high security data), may be stored on computer storage I-ext memory unit 156 via Internet 150, telecommunications system 148 and router/server 146. In this manner, the common data or remainder data is stored on hard drive 168 and the highly sensitive data is stored off site in a secured location. Access to that secured location may be limited via security layer 157. If the user implements an encryption system (see encryption e 118 in FIG. 1A), the extracted data is further secured by the encryption during the transfer from computer 140 through network 145, router/server 146, telecommunication system 148, Internet 150 and ultimately to computer storage I-ext 156.

The present invention may also be embodied utilizing an Application Service Provider on server 152 and in a client-server network.

An implementation of the present invention over Internet 150 most likely includes the use of a uniform research locator or URL for map memory computer 158, computer storage I-ext 156, computer storage I-com 158 and ASP server 152. In a client-server environment, server 152 acts as a server generally commanding the operation of client computer 140. Of course, persons of ordinary skill in the art recognize that the server may be located on the local area network 145 rather than being interconnected with Internet 150 as shown in FIG. 2. The claims appended hereto are meant to cover the alternative embodiments.

As an example of a client-server or web-based implementation of the present invention, the user at computer 140 may define the filter 102 as described above, and input data (plaintext) via keyboard 161 or load plaintext data from floppy drive 162 or CD-ROM drive 160 into RAM 166. In any event, whether the plaintext data is input via keyboard 161 or copied or accessed from floppy drive 162 or CD-RW drive 160, the plaintext data is filtered as discussed above in connection with FIG. 1A. Prior to filtering, it would be appropriate for the user at computer 140 to identify where the remainder data or common data will be stored and where the extracted or high security data would be stored. A simple program may automatically select the secure store location. The system is sufficiently flexible to enable the user to select local storage on different memory segments of PC 140 (hard drive 168, floppy drive 162, CD-RW drive 160) or be flexible enough to enable user at computer 140 to designate off site storage of the high security data (extracted data) and/or the common or remainder data. An automatic store routine may only require the user to accept or reject to preferred first security level, second security level and higher security level stores. The off site data storage process may include activating server 152 and enabling the server to take over the process directly from user 140. In other words, the user at computer 140 could call up the URL of the server 152, the server could request certain user information (user name, password), and would request data from the client computer to establish the filter pursuant to input selected by the user. The client compute may (a) filter the plaintext thereat or (b) send the data to the server for filtering. The server could store data either locally on computer 140 or remotely at computer memories 154, 156. After storage of the data at any of these locations, the server 152 may establish a map and store the map in memory location 158. Of course, remainder data (clensed, plainttext data)and the map may be stored at ASP 152 or client computer 140. The map, if stored at map storage 158, may be downloaded to the user at computer 140. The filter may be stored at computer 140 or may be stored at a secured location on server 152. Alternatively, the map could be destroyed on user computer 140. The filter could also be destroyed on user computer 140. Of course, the filter could be stored in a fourth remote location (not shown), different from I-com 154, I-ext 156 and map computer memory 158. Storage of the map and decryption keys is a critical, high security task. Appropriate security measures should be utilized to protect those items. Local removable memory storage on disc in floppy drive 162 or disc in CD-RW 160 may be reasonable. All traces of the map, the filter, the encryption key, the extracted data, and possibly the remainder data may be scrubbed or deleted from all computer memories (by write-over or disc reformat routines) other than the "com" and "ext" storage sites. Deletion of all URLs, links, x-pointers, etc. is also recommended for high security applications. Deletion systems are known to persons of ordinary skill in the art. For multiple security levels, multiple web site for storage of cleansed plaintext, first, second, third and higher security level extract text is preferable. Where the community of interest has access to the targeted and protected data via the Internet, multiple secured storage locations, multiple stores for filters, for encryption keys and for maps locating the secured stores is provided by multiple storage locations distributed throughout the Internet.

To reconstruct the document, the user at computer 140 would be required to call up the URL of server 152 and input the appropriate security code. The server 152 would then call up and download data from various memory locations whether they be memory locations on computer 140 or memory locations I-com 154, I-ext 156 and map memory 158. The system compiles the entirety of the plaintext document by gathering the dispersed components thereof or compiles partial reconstructious for different levels of security. By implementing different security levels, the system is dynamic enough such that server 152 can easily locate the various extracted data levels based upon various security codes representing different security levels, as those codes are input by the user at computer 140. Multiple security codes, at the inception and during the process, may be utilized. The user may be required to input security codes at multiple times during the reconstruction or compilation process.

It should be noted that computer storage 154, 156 and 158 may be located on the same computer or may be located on different computers spread throughout the Internet. If the storage units are different computers spread throughout the Internet, computer storage 154, 156 and 158 would each have their own URL or Uniform Resource Locator. In any event, during reconstruction, the server 152 gathers the information and downloads the information into RAM 166 of computer 140. This download may include a first download of the common or remainder data from I-com 154. At a separate time, which may or may not include a decryption routine, the extracted from I-ext 156 is downloaded. Preferably, other than inputting initial security codes and any required or desired intermediate security codes, the system operates automatically without further input from the operator at client computer 140. The download of both data sets may be simultaneous in that the download is not humanly perceivable. This is especially true if storage in different memory locations in PC 140 is utilized.

The role of server 152 may be expanded or reduced dependent upon the desires of the user and the degree of security necessary. For example, server 152 may only enable separate storage of extracted data in I-ext 156. In this limited role, server 152 would require the input of a proper security code and clearance prior to identifying and enabling the download of extracted data from I-ext 156.

In an expanded mode, server 152 may be involved in filtering the data, extracting the security sensitive words, characters, icons or data objects to obtain extracted data and remainder data thereat, separately storing the extracted data from the remainder data (extracted data being placed in computer memory I-ext 156 and remainder data being stored in common remainder data memory I-com 154) and then permitting reconstruction via separate or combined downloads of the remainder data and the extracted data into computer 140.

Figure 3:
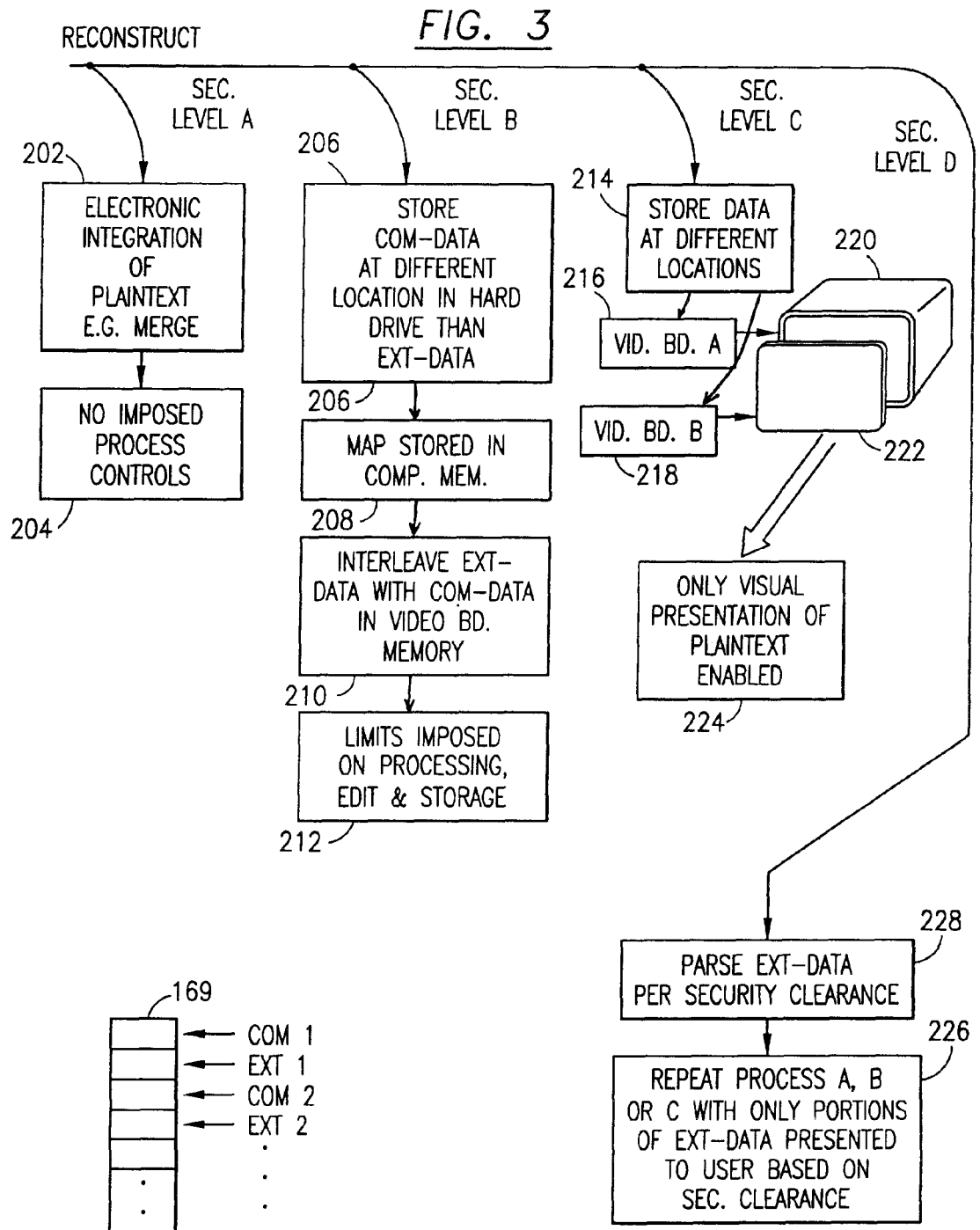
FIG. 3 diagrammatically illustrates a basic flowchart showing reconstruction for various security levels.

FIG. 3 diagrammatically illustrates a system diagram for various reconstruction routines. A complete reconstruction is shown as security level path A. This involves an electronic integration of plaintext in step 202 resulting from the complete electronic reconstruction of document 100. For example, a merge may occur between the extracted data and the remainder data or common text data. The document is completely compiled in this process. Placeholders in the remainder document are utilized to locate and insert the extracted data. Most likely, there will be no process controls imposed on the integrated document as shown in step 204. In other words, if the user at computer 140 has the proper security clearance, he or she could download or recreate the entire original source, plaintext document and the user would be entitled to edit the document or change it in any way or copy it and reproduce it.

The second level of security, path B, results in storage of the common or remainder data in a different memory location on the hard drive 168 as compared with the extracted data. This is noted in step 206. Another words, in a simple example, hard drive 168 or RAM 166 would hold a copy of a remainder data document and another copy of the extracted data document, that is, two separate documents. Since two documents are available in RAM 166 or hard drive 168, these documents are stored in different locations in the memory. In step 208, a map showing the memory location of the common or remainder document and the extracted data document is provided to computer 140. Step 210 commands the processor CPU 165 in computer 140 to interleave the extracted data with the common or remainder data in the video board memory. In this process, the extracted data would typically have placeholders for the missing remainder data. Otherwise, control codes to locate the extracted data into the remainder data would be executed by CPU 165 to properly place the extracted data into the "visual space" of the placeholders in the remainder data document. The extracted data document may have placeholder for the remainder data. Some type of register between the two image documents may be necessary. The compiler, in this embodiment, gathers the document elements and visually compiles and presents the plaintext to the user.

FIG. 3A diagrammatically shows that video board memory 169 is loaded with remainder or common data 1 and a different location of the video memory is loaded with extracted data 1. The next video memory location is loaded with common data 2 and then a different video memory location is loaded with extraction data 2. Since the refresh rate of computer monitor 163 is fast, the display 163 will show the common or the remainder data and then show the extracted data such that the user could not humanly perceive a difference in the document. However, the user could not copy the document from display screen 163 (a "screen shot") since the document is never electronically integrated into a single document. There is only a visual presentation of the combined document by interleaving the extracted data with the common or remainder in the video memory 169. Step 212 notes that the user may be limited in his or her ability to process, edit and store the reconstructed and presented plaintext document.

Security level path C recognizes in step 214 that the data is stored in different memory or computer locations. In this situation, two video boards, video board A and video board B are shown as board 216 and 218. Video board 216 drives display monitor 220. Video board 218 drives display monitor 222. Display screens 220, 222 are overlaid atop each other. Video board 216 is fed with common or remainder data from the remainder data store (see I-com store 154 in FIG. 2) and video board 218 is fed with the extracted data from the extracted data store, for example, I-ext store 156. In this manner, as noted in step 224, the user is presented only with a visual presentation or compilation of the plaintext. Since there was physical separation between video monitor 222 and video monitor 220, there is no electronic integration at all of the plaintext document. Hence, the ability for the user to do any significant editing on the plaintext document is blocked or prohibited because the user only has access to either the data on video board 216 or the video board 218.

Security level path D shows that the extracted data may be parsed or further separated based on a plurality of security clearances in step 226. Step 228 recognizes that the system can repeat process and security process paths A, B and C only with portions of the extracted data presented to the user based upon the user's security clearance.

Figure 4:
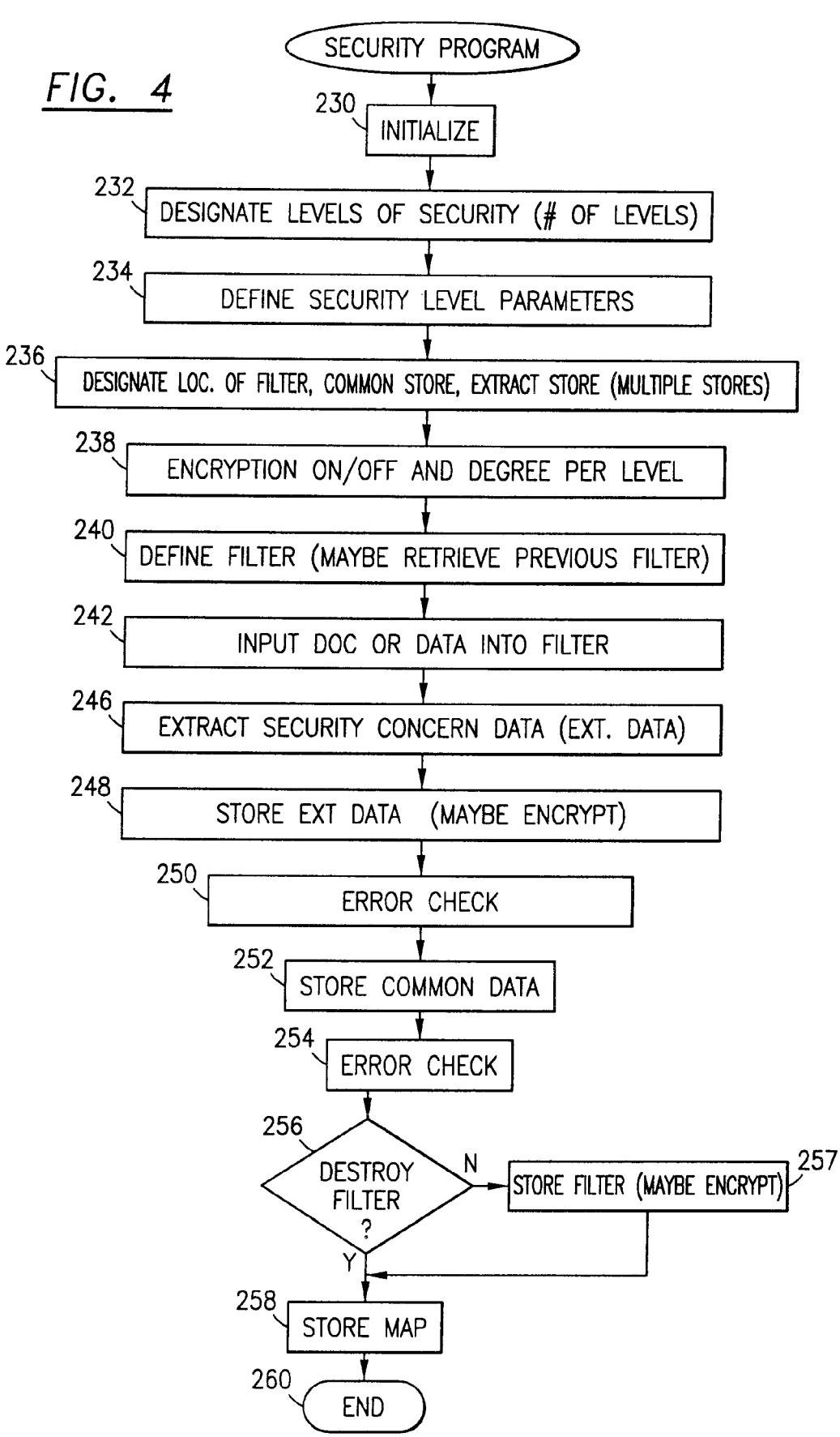
FIG. 4 diagrammatically illustrates a flowchart showing one embodiment of the principal portions of the data security program.

FIG. 4 diagrammatically illustrates the major components of a flowchart for the data security program. It should be noted that this flowchart may be truncated to limit user selection of certain items. The system would be pre-set to contain these features. Step 230 initializes the system. Step 232 enables the user to designate various levels of security for the activity which he or she will soon engage. The system, in step 234, enables the user to define the levels of security parameters. The following Security Table gives some examples of the type of security that may be available to the user.

| Security Table |
|---|
| to whom |
| to where |
| when (time of day, day of week, month, floating but predetermined time frame) |
| why (purpose, match purpose to other security parameters or to certain predetermined criteria) |
| how (through what medium (LAN, WAN, Internet, direct dial link), download to what site or destination) |
| how long (duration) the reconstruction process will be permitted per each security clearance level |
| how much (different security levels enable reconstitution of documents and data with different amounts of secure data therein) |
| timing systems may require synchronization for a standard clock (i.e., atomic clock) |

As an example of a truncated or pre-set program, a client-server system over the Internet may have URLs designating storage sites and an ASP 152 (FIG. 2) controlling storage. In this pre-set system, the user does not select the sites. The sites may be randomly selected by ASP 152. The ASP may use artificial intelligence AI to locate secure extract data storage sites. AI or inference machines can ascertain (a) traffic on communications channels, (b) storage limit issues, (c) transmission failures in the communications links, and (d) the degree of security necessitated by exterior events, i.e., terrorism alerts, virus alerts, war, data security warnings posted by trusted sources, MicroSoft, Norton, NASA, DoD, CDC, FBI, etc. Higher security alerts trigger the AI configured storage locator and facilitator to locate memory stores in higher secured places. These higher security facilities may be more costly, may be located in more stable countries or on more stable servers and may have greater degrees of encryption capabilities.

The user, in step 326 can designate the location of the filter, the common storage area for the remainder data, the extraction data storage and potentially multiple data storage areas or segments. The user may enable an AI filter design. Step 238 permits the user to engage or disengage encryption and, if engaged, establish the degree of encryption for the system. Step 240 enables the user to define the parameters of the filter. The user can retrieve a preexisting filter or may define a new filter for each data security session. These filters may consist of dictionaries or any type of compilation of words, characters, icon, data objects or pixel formation or any indication that can be perceived by the computer system. Granular extraction of data elements in a data object may be permitted. Step 242 recognizes that the user either inputs a preexisting plaintext document or types data into the system. In any event, the plaintext document is fed through the filter. Step 246 extracts the security data from the input document. Step 248 stores the extracted data. The extracted data may be encrypted prior to storage. Step 250 conducts an error check on the extracted data. This error check is helpful in discerning problems in the storage of the data prior to closing down the data security system. Step 252 stores the common data or the remainder data. Step 254 conducts an error check on the common or remainder data. The decision step 256 determines whether the user has selected a "destroy filter" command. If not, the filter is stored with or without encryption in step 257. If YES, the filter is destroyed with a deletion routine. Typically, deletion is complete erasure of all traces of the file including, in high security systems multiple write-overs or disc reformatting. Step 258 stores a map. The map may be stored locally or remotely as described earlier. The system ends in step 260. All traces of these data elements or objects may be swiped clean or removed from whatever computer system generated the data objects or processed them, other than the memory storage locations. Deletion of data also includes the concept of deletion of data transmission paths, URLs, storage site locations and all temporary memory stores. Deletion of file location in the root directory of hard drive 168 of computer 140 is preferable in high security systems.

Figure 5:
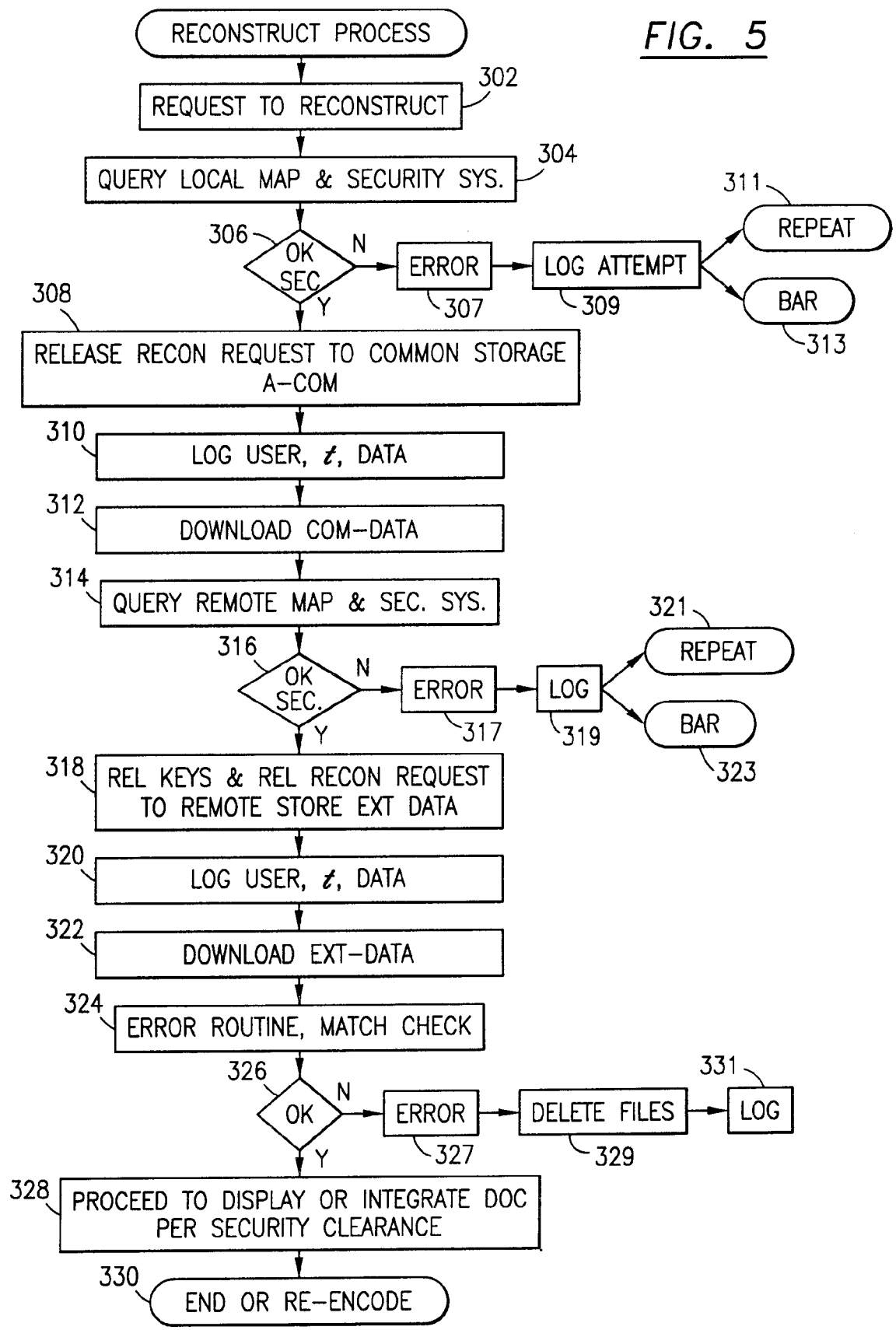
FIG. 5 diagrammatically illustrates a flowchart showing the basic elements of the reconstruction process for the data security program.

FIG. 5 diagrammatically illustrates basic flowchart features for the reconstruction process. Step 302 accepts a request to reconstruct the secured data. Step 304 queries a local map and the security system or protocol. In a preferred embodiment the user would have to input several passwords, one of them being a local password on computer 140. A local map which may be accessed only through the password, may simply identify the URL of server 152. Decision step 306 determines whether the local password is acceptable. If not, and error step is indicated in step 307, the attempt to log on to the security system is noted in step 309 (an audit trial), and the system either branches to repeat step 311 or bars the user from further activity in step 313.

Returning to decision step 306, if the password is locally acceptable, the YES branch is taken and the system executes step 308 which releases a reconstruction request to the common storage facility I-com 154 or A-com 108 (FIGS. 2 and 1A–B). The system in step 310 logs the user in, as well as time and date and the data regarding the request. In step 312, a download from the common data storage is provided to RAM 166 or hard drive 168.

In step 314, a query is made to obtain the remote map from the remote security system. The decision step 316 indicates that the user again successfully inputs his or her security code. If not, error routine 317 is activated, the password failure is noted in step 319 (an audit trial), and the user is given an opportunity to repeat in step 321 or is barred or prohibited from further activity in step 323. If the user has correctly input the security code, the system in step 318 releases the keys (to decrypt) and the map and releases the reconstruction request to the remote storage for the extracted data. This could be computer storage I-ext 156 or computer storage B-ext 110. In step 320, the user's access to the extracted data is logged in along with the time and day and type of data request. In step 322, the system downloads the extracted data into RAM 166 and/or hard drive 168 of computer 140. In step 324, an error routine is operated on the extracted data in order to insure that the extracted data properly matches the common or remainder previously stored. Decision step 326 determines whether the error routine properly generates the correct count or output. If not, the system in step 327 indicates an error, in step 329 the system deletes the common files and the extracted files and the system in step 331 logs in the failed attempt. If the error checking routine on the extracted data is acceptable, the YES branch is taken from decision step 326 and the system, in step 328, proceeds to display the plaintext document or to integrate the plaintext document pursuant to the security clearance initially input by the user. Step 330 ends this process. The end process may entail encrypting the data again and swiping clean all traces of data objects from the memory stores and computer handling units. Of course, every use of encryption requires decryption of the data prior to reconstruction.

The system may incorporate various types of security systems or routines.

pass word pass phrase multiple choice questions and answers initial, intermediate and subsequent security clearance routines biometric security routines (voice, fingerprint, signature, eye or retina scan)

The reconstruction routines may be interrupted or the security system automatically activated or initiated upon the occurrence of externally generated triggers or upon certain predetermined conditions or conditional events. Limited extraction, security clearance, release of data and reconstruction limits may be imposed. Artificial intelligence (AI) engines, inference engines or neural networks may be implemented to vary the permitted level of reconstruction via the security clearances. In other words, the AI system, as applied to reconstruction, may, relatively independent of the filter and storage processes, increase the necessary security levels permitted to access and generate full or partial plaintext recreation.

The display systems 220, 222 in FIG. 3 include CRT monitors, LCD screens, projection screens and combinations of those systems.

The audit trail to monitor reconstruct and reconstruction attempts may include adding a time/data stamp to the remainder data and/or the extracted data prior to storage and a cross-check to the audit trail log during the reconstruction process.

Placeholders in the remainder document may be:
blank spaces
data symbols or elements "---" or "xxx"
false data
clearly erroneous data "ABC Company" or "Baker"
chaff or hash marks
messages
bar code
serialization data
alerts
links to other data objects
null set indicators "[ ]"
URL or website addresses It is believed that the present invention is faster, during reconstruction, than standard encryption techniques, on the order of 100 to 1,000 faster.

The system and method described herein may operate substantially automatically, that is, without operator intervention, other than the security clearance function. The clearance function does require some type of operator authentication prior to retrieval of the extracted and remainder data.

The system and the method may operate automatically in that the plaintext or originating data could be identified by a party desiring security. The system could obtain that data from any data input device (hard drive memory, floppy drive memory, flash card memory, personal data assistant (PDA), or any other type of data input device), filter the data, separate the extracted text or the remainder text, encrypt (or not encrypt) the data, separately store the extract and remainder data (all automatically, that is, without operator intervention). Hence, it is not necessary that the system operate with significant operator or manual intervention. Of course, the system may also operate on a plaintext document or data object that is being created "in real time" by an operator and keyboard, mouse or other type of data input device.

The automatic operation of the system and the method can be caused by a triggering event. This triggering event may be a security attack (generating a trigger to start the gathering of plaintext, filtering, extraction and storing) or may be any other type of trigger such as a building burglar alarm, door alarm, fire alarm, or virus detection algorithm trigger. The event may be a time of day, week or month. It may be n seconds after the user stops typing on a keyboard. It may be a timed back-up feature.

Multiple filters may be utilized in the system and in connection with the method. These multiple filters may be useful in the operation of the system with a plurality of security levels. Each filter could filter out different levels of security sensitive items and each bundle or group of security sensitive items (from each distinct filter) could be stored at different computer storage locations. Multiple filters, multiple security levels and multiple storage areas may also include multiple encryption routines and decryption routines. Encryption and decryption routines can be related to the level of security of a particular group of data.

Multiple maps may also be provided for singular or multiple storage of extracted data and remainder data. These maps may or may not indicate the originating point of the data. Maps can be parsed such that an intruder, upon discovery of a single map or map portion, could not locate the storage locations of all piece of the extracted data and remainder data. maps may also be encrypted. The map may also be stored at a distinct map store location.

The concept of partial reconstruction also includes the concept that a portion of the plaintext would be reconstructed and the unreconstructed portions of the plaintext could be encrypted or could show blanks or other symbolic indicators. See the placeholder table above.

Partial reconstruction of the plaintext also includes a concept that the security sensitive items or materials may be subject to different types of encryption. Hence, a single plaintext document may have multiple levels of security and multiple levels of encryption wherein each encryption has a different level of security assigned to it.

The present invention can also be configured to provide a computer network which transparently establishes and manages the separation of user-based communities of interest. The separation is accomplished by extraction pursuant to security levels, dispersion of data into secure storage facilities (memory stores) and reconstruction based upon the assigned security level. A low level security clearance results in only partial reconstruction of the plain text or source document. These user-based communities of interest are a plurality of users each having respective security clearances. As described above, each successively higher level of security clearance permits the user to see greater degrees of reconstructed plain text obtained from the extracted data stored in extract stores and the remainder data from the remainder stores. By integrating encryption (and necessarily decryption), separation of user-based communities of interest are established such that the users in a particular community are permitted access to some or all of the plain text data based crypto-graphically separated communities and need to know security levels.

Figure 6:
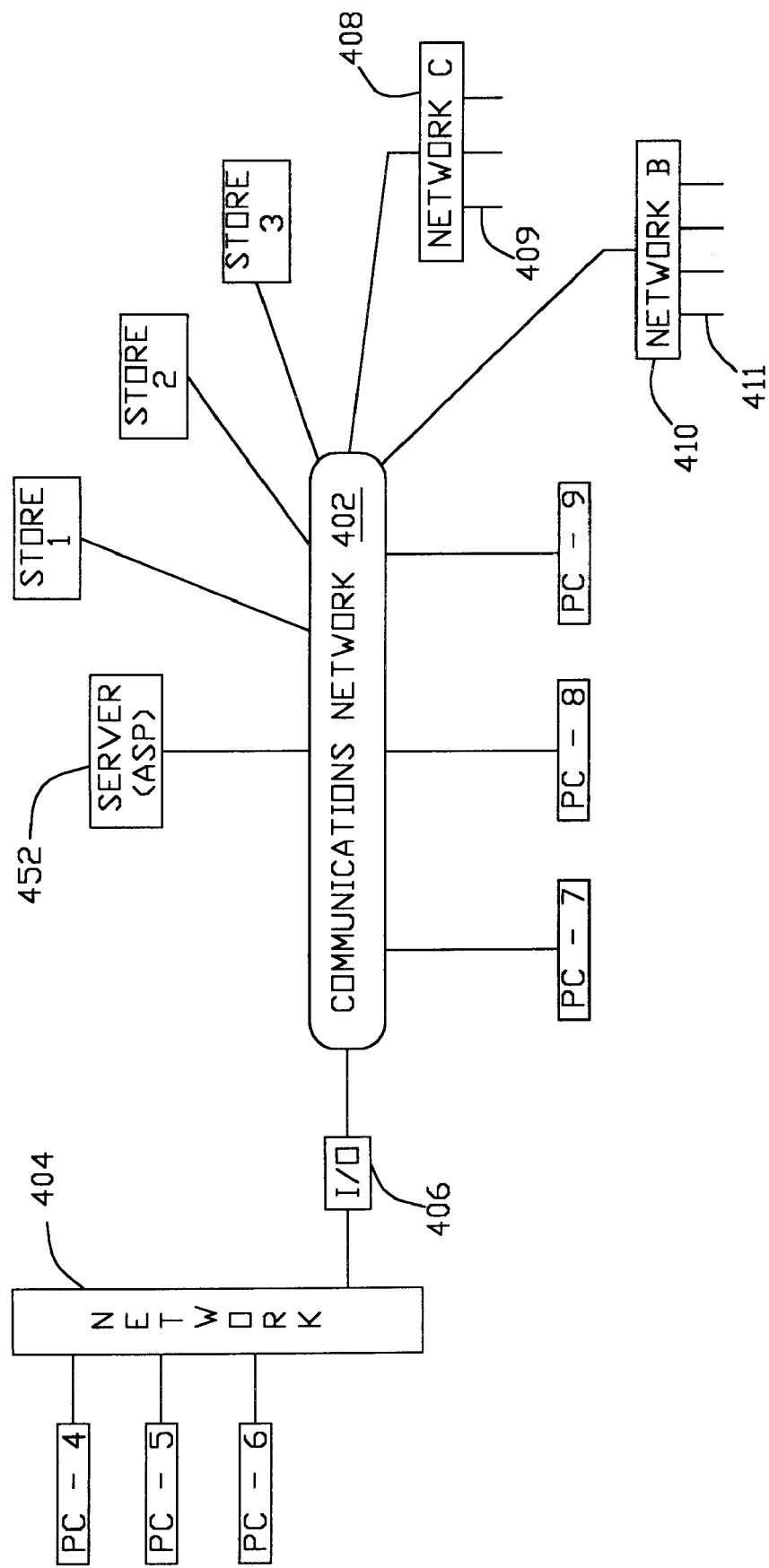
FIG. 6 is a computer network diagram showing various user communities.

FIG. 6 is an exemplary computer network diagram showing various user communities. The telecommunications network 402 is connected to the server application server provider ASP 452 and to various networks and personal computers or PCs. the PCs may be computer work stations. Network A 404 is coupled to telecommunications network 402 via an input/output unit 406. Network A is coupled to various PCs identified in FIG. 6 as PC-4, PC-5 and PC-6. Of course, Network A could be coupled to other PCs not illustrated in FIG. 6. As described earlier, server 452 can facilitate remote or offsite storage of extract data and remainder data in store 1, store 2 and/or store 3. Further, the map showing the storage location may be encrypted and stored in any one or more of these stores. Also as described earlier, the memory in one of the PCs, for example PC-4, PC-5 could be utilized to store extract data and remainder data from PC-6 and PC-6 can be configured as the input data computer. Hence, the present system and methodology encompasses the concept of local storage and remote storage. On the local level, the storage begins by storing the extract data at different locations in the hard drive of the PC. The next level higher is storing the extract data in removable computer media such as floppy disk, removable tape drives, CDs etc. associated with the PC accepting data or associated with a server on Network A. The next higher level of extract store is storage of the extract data on a server or other computer in a particular network. If PC-6 is designated as the input computer, the extract data may be stored on PC-4. Of course, PC-4 could be designated as the server for Network A.

PC-7, PC-8 and PC-9 are coupled to telecommunications network 402. Network C 408 and Network B 410 is coupled to communications network 402. The lines, one of which is line 409 extending from Network C 408, represent a plurality of computers or workstations coupled to Network C. Line 411 represents a plurality of workstations or computers coupled to Network B 410.

Figure 7:
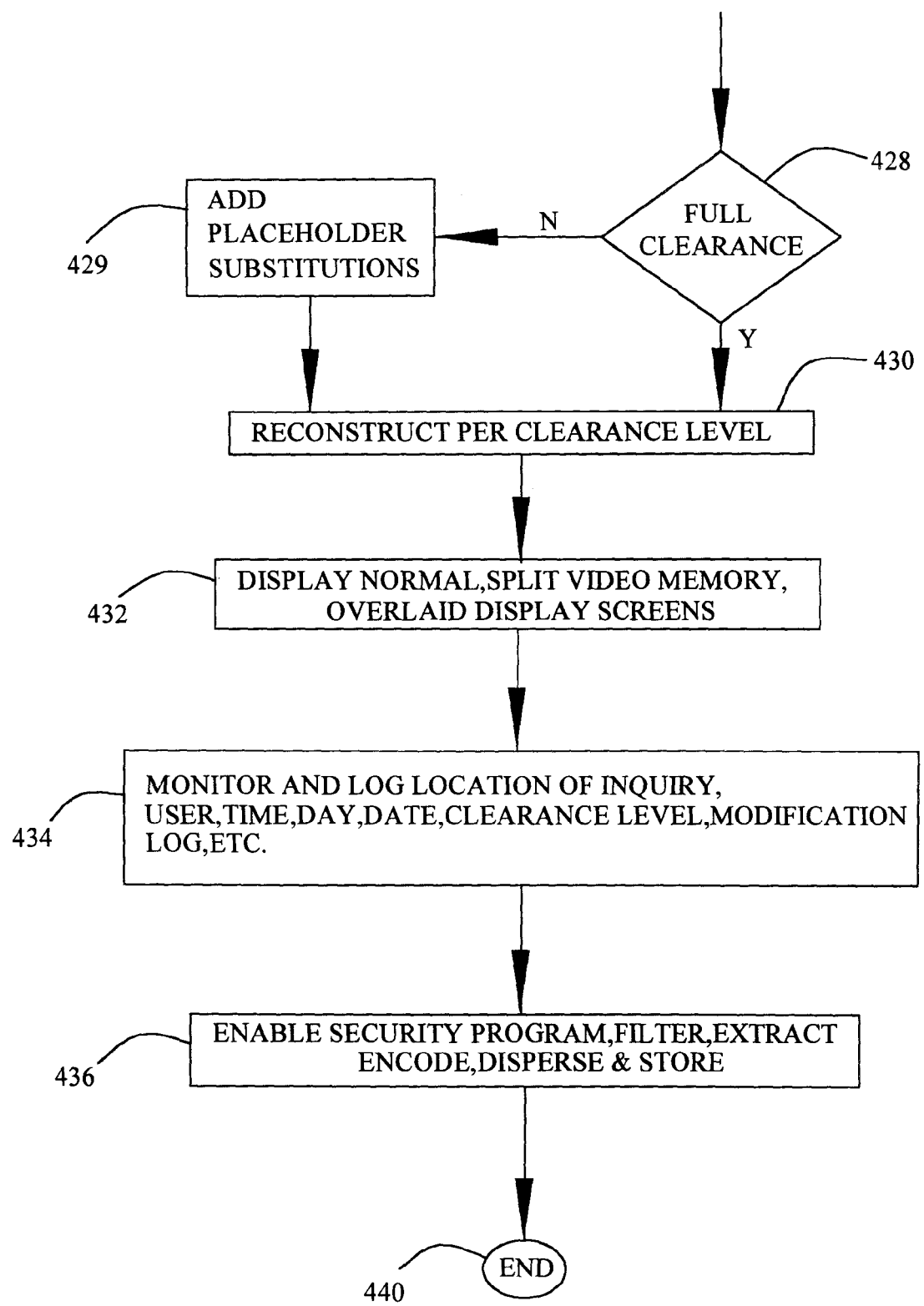
FIG. 7 diagrammatically illustrates a flowchart showing the key component steps for the multiple layer security program for the community of users.

FIG. 7 diagrammatically illustrates a flow chart showing the key component steps for the multiple layer security program for the community of users. The "community of interest" system described herein enables persons and organizations at the same security level to share data on a peer to peer level. Further the security system may operate automatically, with respect to extraction, storage and reconstruction, such that the peer to peer dissemination of data objects is quickly and readily available to all at the same or higher security levels. Step 420 initializes the program. Step 422 enables the user, administrator or system operator to designate multiple levels of security, that is, multiple words, characters, icon, data objects, or whatever, for each security level and further to define encryption for each security level. The designation step 422 also includes identifying the communities of interest and the particular security level and security clearance for each community it, of interest. One example of various security levels for communities is set forth below in the Community Security Level Table which is keyed to the computer network diagram of FIG. 6.

Community Security Level Table

| Security level | Community Group |
| --- | --- |
| High | PC-7; PC-8 |
| Medium high | all high group plus Network B |
| Medium | all above plus Network A |
| Low | all with nominal clearance |
| Special set medium | PC-7; PC-9; Network B |

Further, designation step 422 will include identifying the words, phrases, icons or data objects subject to security concerns and the potential location of the extract data and, if necessary the remainder data and the degree of encryption. The following Selection Table provides some examples.

Selection Table

| Level of encryption/storage | type or category of word or phrase; input specific word, phrase |
| --- | --- |
| High, web-based storage | dollar values, names of streets, countries, "Smith" and 5 words about "Smith," "avocado" |
| Medium high, remote storage | all addresses, all names |
| Medium network storage | all family names, all client names |
| Low, encrypt and separate store in local memory | all items not in dictionary |

As an example of various encryption methodologies, the following Encryption Table is illustrative.

Encryption Table

DES, random pad A ("r. pad A")
Huffman, r. pad B
Crypto API, r. pad 7
Two fish, r. pad C-2
Blowfish
RC4
Skipjack
Ghost In FIG. 7, step 424 executes or enables the security program with multiple filters, multiple encryption levels and multiple storage levels. Each one of these filters, encryption levels and storage levels correspond to the security level for the various communities of interest. Step 425 responds to an inquiry from a user to reconstruct the document. Step 426 accesses the user's security clearance and the particular inquiry. Decision 428 determines whether the inquiring party is entitled to full or partial access to the source document. If not, the NO branch is taken and the system, in step 429 adds place holder substitutions. Step 429 may be optional. If YES, the system reconstruct pursuant to the clearance level in step 430. The following provides an example of multiple level encryption utilizing place holder substitution.

Multiple Level Encryption

Applicants must be _____zzxx xx _____xxx_____ _____ _____ citizens and have a high school diploma or equivalent. They must possess a valid subsubsub driver's license and qualify for top SUBWORD_____ clearance.

With this multiple level encryption, substitutions may be utilized "subword" to indicate to the user with a less than superior security level that a certain word, term or phrase has been extracted and stored by he or she is entitled to know that substitute word, term or phrase has been inserted into the plain text document. Of course, any type of substitution character may be used for the place holder.

In step 432, the system displays the plain text in a normal format or utilizing a split or bifurcated video memory or utilizing overlay display screen. FIG. 3 and the description of that figure set forth above describes the normal display in steps 202, 204, the split video memory display in steps 206, 208, 210 and 212 and the overlay display system in steps 214, 216, 218.

The system, in step 434, monitors and logs the location of the user making the inquiry, the type of inquiry, the time, day, date, clearance level and access level and logs all modifications to the plain text source document. One example of the log is set forth below in the Security Report Table.

Security Report Table

Privacy Scrubber Report source file: path\filename
    scrubbed file: path\filename-scrub
    source file: date, time, size
    process: date, time
    user: name
    system: name
Recovery File (a) storage location, type of encryption, random key
    (b) storage location B . . .
    (c) store C . . .
    (d) store D . . .

Step 436 enables the security program and parses and extracts the data per the security program, filters the data, extracts it and codes it disperses it and stores it as discussed above. The multiple layer security program ends in step 440.

The following Security Level Access Placeholder Table is another example of the type of placeholder substitutions that may be available. The example in the Security Table Access Placeholder Table may be used in conjunction with step 429.

[security level 2] intelligence located [security level 4] 20 miles from [security level 4]. He is using the name [security level 4], and dressed as a [security level 4] preacher. With him are his lieutenants, [security level 4] and [security level 4]. He is communicating with the international media through Mr. [security level 4], who resides at [security level 3], [security level 4], [security level 4]. Telephone is [security level 1] and Facsimile is [security level 1].

It should be noted that in order to reconstruct some or all of the plain text source data, some or all of the subsets of extracted data from the extract stores will be utilized dependent upon the respective security level of the inquiring party or user.

The present invention can also be configured as an adaptive security program which adapts and adjusts the security provisions based upon intrusion into a particular network or attempts to electronically attack or hack into that network or successful hack events. Programs are available to track electronic attacks or hacking attempts. One of these programs is manufactured by Cisco and identified as the Cisco Intrusion Detection System (IDS). The Cisco IDS system can work on a server or on PCs in a network. The Cisco IDS is an electronic intrusion detector, or an electronic attack detector or a hacking monitor. The hack or attack monitor is software loaded into a designated computer.

The output of the electronic attack or hacking monitor loaded into PC 142 (FIG. 2) for example, or loaded into PC-6 acting as a server for Network A 404 in FIG. 6, generates a plurality of attack warnings. The attack warnings progressively and incrementally indicate the severity and degree of intrusion and hacking attacks directed to the computer system. The following Security Level Table illustrates an example of various responses to increasing levels of attacks. These increasing security responses include engaging the filter and extracting critical data and storing it locally; the next level involves storing the critical data on removable storage media; the next higher level involves offsite storage of all security data; the subsequent security alert results in multiple offsite storage for multiple levels of security or critical data and the highest level involves offsite storage of both common data (remainder data) and security data. Of course, other combinations responsive to the hack attack may be provided. The electronic attack monitor may use artificial intelligence AI to (a) assess the severity of the attack, (b) plan an appropriate "secure data" response, (c) select the degree of filter, extraction and/or encryption, and (d) locate secure extract data storage sites. AI or inference machines can ascertain (a) traffic on communications channels, both intra and inter network, (b) storage limit issues, (c) transmission failures in the communications links, and (d) the degree of security necessitated by exterior events, i.e., terrorism alerts, virus alerts, war, data security warnings posted by trusted sources, MicroSoft, Norton, NASA, DoD, CDC, FBI, etc. Higher security alerts trigger the AI security monitor to heighten the security level (or to decrease that security level in view of a reduction or withdrawal of an electronic attack). Aspects of AI systems, inference engines and neural networks are discussed above in conjunction with the AI configured filter. These AI aspects can be utilized with an AI configured security sensor.

| Security Level Table |
|---|
| Attack (low threat level) Level One |
| engage filter |
| local storage - disk drive |
| encrypt map |
| Attack (moderate threat level) Level Two |
| same as Level One but use removable storage media (local) |
| Attack (nominal attack) Level Three |
| Engage higher level filter |
| Off site storage, single storage for all security data |
| Attack (moderate attack) Level Four |
| Multiple off site storage, multiple levels of security data |
| Attack (severe attack) Level Five |
| Off site storage both common data and security data |

Hence, the filtering of data is based upon respective ones of the plurality of attack or hack warnings and the extraction of data and degree of extraction is dependent upon respective ones of the plurality of attack—hack warnings. Storage of the extracted data and the remainder data is also based upon the degree of attack which is reflected in the attack—hack warning issued by the monitor.

Figure 8:
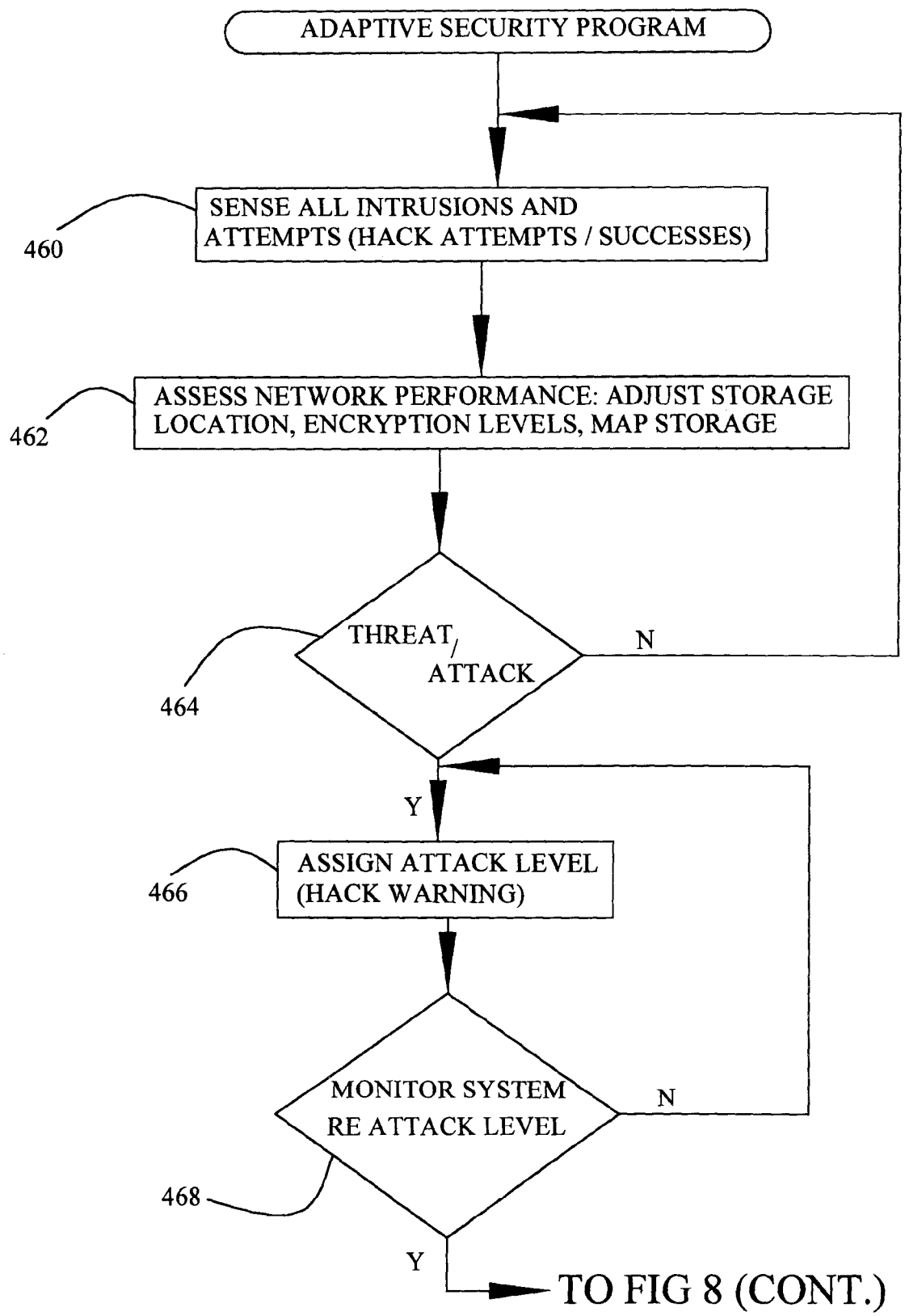
FIG. 8 diagrammatically illustrates a flowchart showing the key components of an adaptive security program adaptable to various levels of electronic attacks, hacker or hack attacks.
Figure 8:
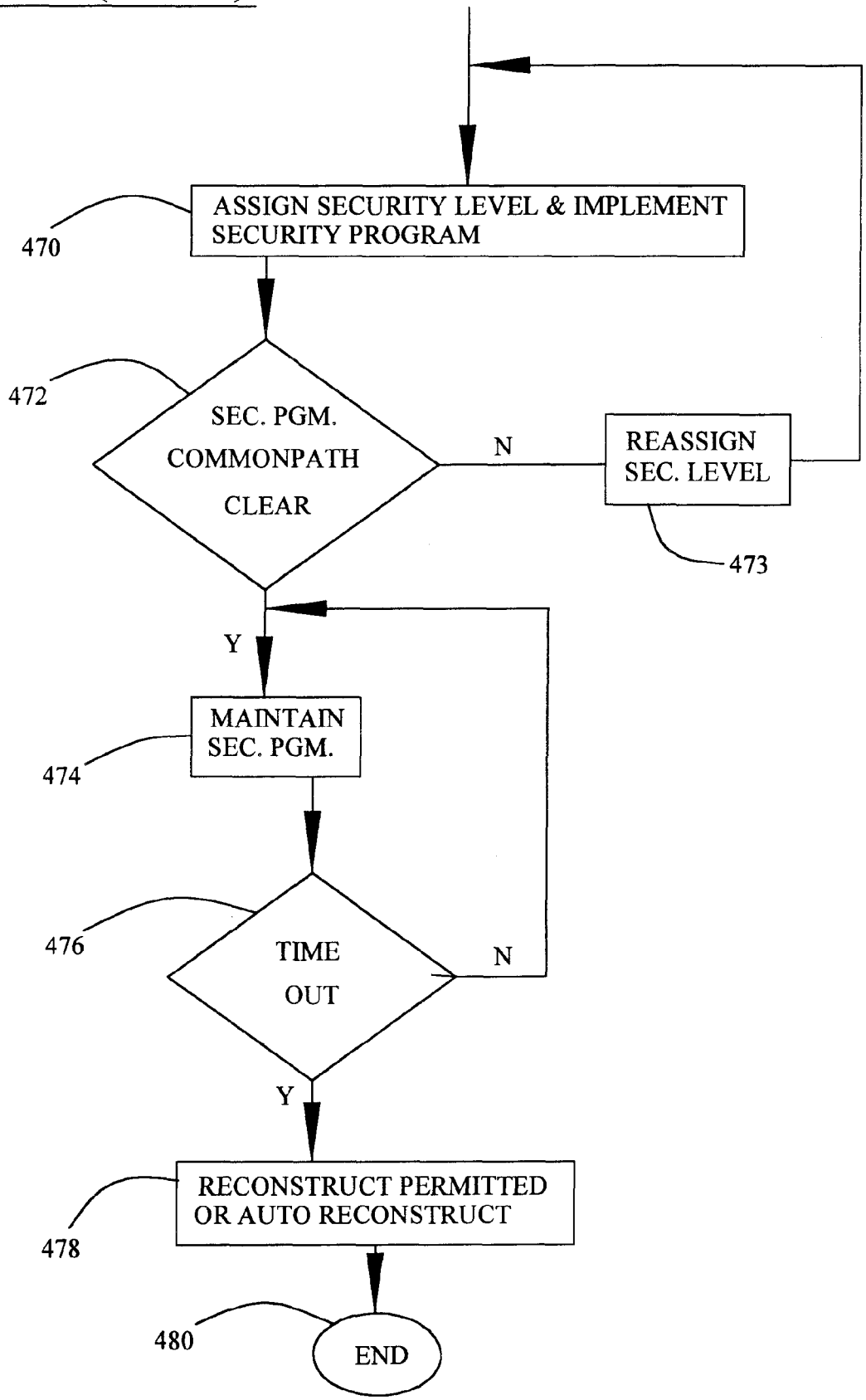

FIG. 8 diagrammatically illustrates a flow chart showing the key components of the adaptive security program adaptable to various levels of hacker of electronic attacks. Step 460 senses all intrusions and attempts, that is, electronic attacks, hack attacks or hacking actions on a computer or a computer network. This step is equivalent to the output of the attack—hack monitor. Step 462 assesses the current network performance, adjusts the storage location for the extract data (the location of the extract store), the encryption level (the degree of encryption) and the storage of the map showing the extract data storage (if necessary) and storage of remainder data, if necessary given the severity of the attack. For example, during high utilization of the computer network (high utilization in a server computer in a server-client environment), local storage of extracted data may be preferable as compared with offsite storage of critical data. However, if the attack occurs during non-working hours, the performance of the network is very high, and the security system could utilize all the resources in the computer network to achieve the security goal of safe guarding the data during the attack. System resources include processing resources (for encryption/decryption), bandwidth resources to store extract data and any other resources that are critical for the utilization of the security system described herein. Decision step 464 determines whether a threat or attack as occurred. If not, the system takes the NO branch returns to step 460. If YES, the system in step 466 assigns an attack level or a hack warning level to the threat or attack. The system in decision step 468, monitors the network during the attack. If the network performance or the computer performance does not change, the YES branch is taken. If the computer performance or network performance changes based upon or during the attack, the NO branch is taken and the system returns to step 466 which reassigns an attack level or a warning level to the next higher or significantly higher warning levels.

After decision step 468, the system executes step 470 which assigns the security level and implements the security program based upon the attack. It should be noted that the administrator establishes the degree of security level, the encryption, the extract store and remainder store (if necessary) for various levels of attacks or hack warnings. The security level assigned to a particular attack warning is implemented in step 470. Decision step 472 determines whether the security program's communication path is clear. For offsite storage of extract and/or remainder data, a communication path is important. If the path is blocked or compromised by the attack, the NO branch is taken and the system in step 473 reassigns the security level to a next higher level or a different, safer security level and returns to step 470. If the security and communications path is clear, the YES branch is taken from decision step 472 and, in step 474, the system maintains the security program. Decision step 476 determines whether sufficient time has passed from the attack. If not, the system loops to step 474. If YES, the system executes step 478 which either permits reconstruction of the user operating the plain text or source document or automatically reconstructs those documents that were filtered, parsed, extracted, and subject to outside storage. The system ends in step 480. To provide additional security, the attack monitor can be configured to monitor security warnings from trusted parties such as MicroSoft, Norton, NASA, DoD, CDC, FBI, etc. Emails or electronic communications from trusted parties can trigger higher levels of security. the attack monitor described above can be configured to accept messages from trusted parties. These messages are equivalent to detecting an electronic attack.

Further, the attack—hack monitor can be configured to monitor and assess other environmental conditions such as fire, power failure, equipment failure, unauthorized physical entry into the building, plant, or computer room. These exterior threats or events are monitored by the attack monitor since they may quickly develop into an electronic attack on the secured data retained by the computer system. In response to these exterior events, the attack monitor generates corresponding attack warnings similar in nature to the hack attack warnings discussed above.

There are various methodologies that may be utilized in the adaptive system. The tables that follow set forth these various security methodologies.

| Mode | Normal | Threat | Attack |
|---|---|---|---|
| | Standard Automatic Defenses Matrix | | |
| Encryption | Targeted Encryption | Full Encryption | Multi Type Encryption |
| Extraction | Plain-text Extraction | Extraction of Encrypted Data | Extraction of Multi Type Encryption |
| Distributed Dispersion | Single Storage Location | Several Storage Locations | Many Storage Locations |
| Display | Single display | Color/Dither Protection | Multiple Displays |
| | Optional Automatic Defenses Matrix | | |
| Substitution of Code Words | None | Partial | Many |
| Substitution of Misinformation | None | Partial | Many |
| Controlled Release-Storage | Full | Partial | Conditional |
| Storage Locations | 2 | 4 | 10 or more |
| Time for release | Anytime | Working Hours | Conditional |
| Authorized Users | Many | Partial | Conditional |
| What to Release | All | Partial | Conditional |
| Secret Sharing | None | Two Users | As Configured |

| Security Meter Module Table | | | |
|---|---|---|---|
| | Normal Mode | Threat Mode | Attack Mode |
| ENCRYPTION | Targeted encryption (Secret sharing) | Full encryption (Secret sharing) | Multi layer encryption (Secret sharing) |
| EXTRACTION | Plain-text extraction | Extraction of encrypted Data | Extraction of multi encryption |
| Distributed Storage | 1 critical storage | few critical storage | many critical storage |
| Controlled Release-Storage | Storage # ID Time for release Authorized Users What to release Special conditions | 2 users online | 3 or more users |
| Display | single display | single display | multiple displays |
| Substitution of code words | No | No | No |

Normal Work Mode

| | Extraction | | | | Storage | | | | |
|---|---|---|---|---|---|---|---|---|---|
| | Level 1 | Level 2 | Level 3 | Level 4 | Web | Offline | Remote | Removable | Local |
| social security | X | | | | | | X | | |
| credit card | X | | | | | | X | | |
| included | X | | | | | | X | | |
| last name | X | | | | | | X | | |
| number | X | | | | | | X | | |
| telephone | | X | | | | | | X | |
| name | | X | | | | | | X | |
| URL | | X | | | | | | X | |
| e-mail | | X | | | | | | X | |
| uppercase | | X | | | | | | X | |
| initial capital | | X | | | | | | X | |
| currency | | | X | | | | | | X |
| postal code | | | X | | | | | | X |
| address | | | X | | | | | | X |
| location | | | X | | | | | | X |
| date | | | X | | | | | | X |

Threat Mode

| | Extraction | | | | Storage | | | | |
|---|---|---|---|---|---|---|---|---|---|
| | Level 1 | Level 2 | Level 3 | Level 4 | Web | Offline | Remote | Removable | Local |
| social security | X | | | | | | | X | |
| credit card | X | | | | | | | X | |
| included | X | | | | | | | X | |
| last name | X | | | | | | | X | |
| number | X | | | | | | | X | |
| telephone | | X | | | | | | X | |
| name | | X | | | | | | X | |
| URL | | X | | | | | | X | |
| e-mail | | X | | | | | | X | |
| uppercase | | X | | | | | | X | |
| initial capital | | X | | | | | | X | |
| currency | | | X | | | | | | X |
| postal code | | | X | | | | | | X |
| address | | | X | | | | | | X |
| location | | | X | | | | | | X |
| date | | | X | | | | | | X |

Attack Mode

| | Extraction | | | | Storage | | | |
|---|---|---|---|---|---|---|---|---|
| | Level 1 | Level 2 | Level 3 | Level 4 | Web | Offline | Remote | Removable |
| social security | X | | | | | X | | |
| credit card | X | | | | | X | | |
| included | X | | | | | X | | |
| last name | X | | | | | X | | |
| number | X | | | | | X | | |
| telephone | X | | | | | | X | |
| name | X | | | | | | X | |
| URL | X | | | | | | X | |
| e-mail | X | | | | | | X | |
| uppercase | X | | | | | | X | |
| initial capital | X | | | | | | X | |
| currency | | X | | | | | X | |
| postal code | | X | | | | | X | |
| address | | X | | | | | X | |
| location | | X | | | | | X | |
| date | | X | | | | | X | |

Figure 9:
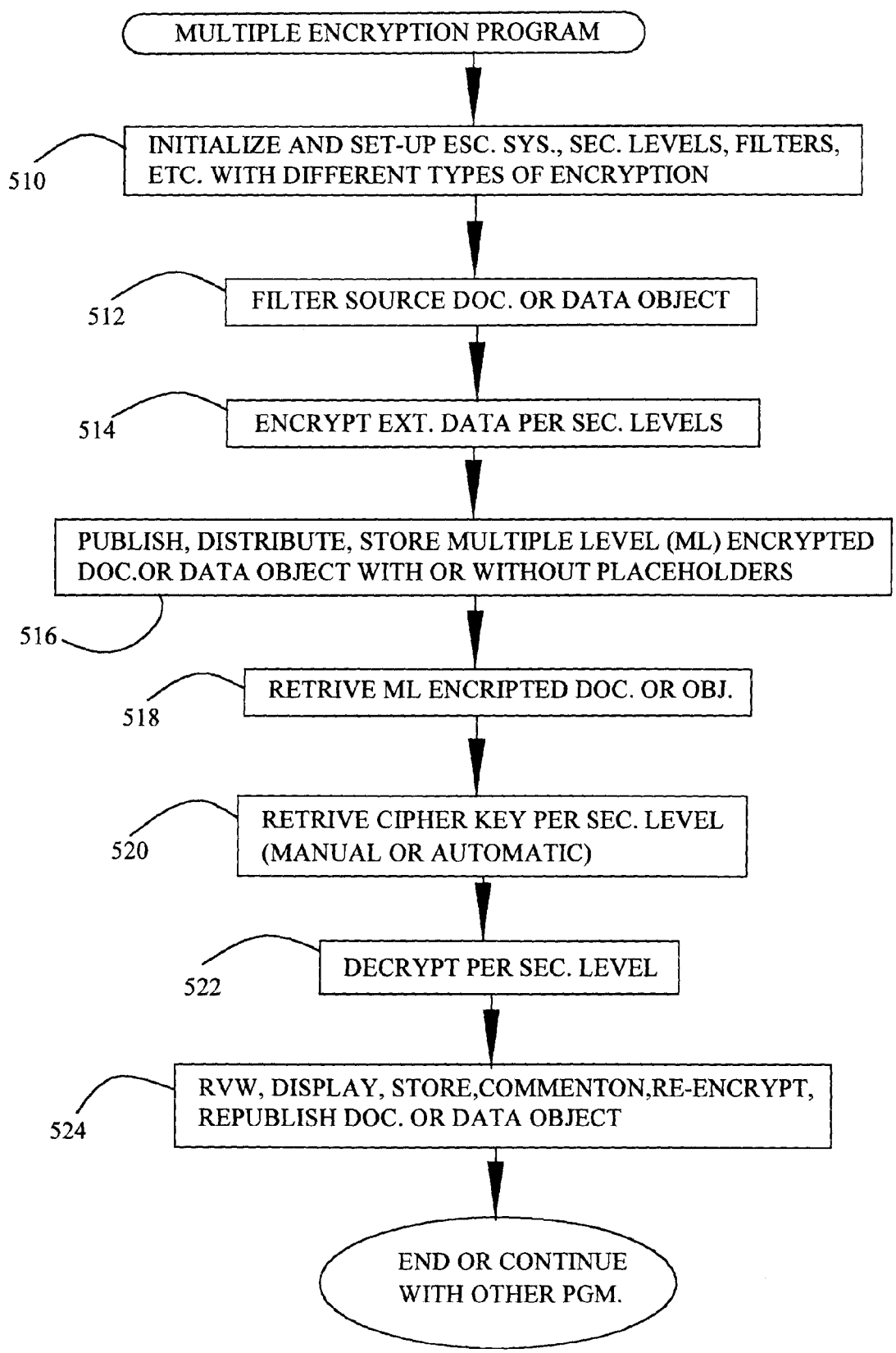
FIG. 9 diagrammatically illustrates a flowchart showing the key components of a multiple encryption program using multiple types of encryption in one document or data object.

FIG. 9 diagrammatically illustrates a flowchart showing the key components of a multiple encryption program using multiple types of encryption in one document or data object. Multiple levels, types or modes of encryption are utilized in the same document or data object to enable securing data and transparently managing the separation of user-based communities of interest based upon crypto-graphically separated, need to know security levels. These security levels are associated with a plurality of encryption types or with different cipher keys using the same encryption. An example of a multiple level encrypted document is shown above in the Multiple Level Encryption sample. Different levels or modes or types of encryption are listed in the Encryption Table above.

Step 510 in FIG. 9 initializes the system by organizing different security levels with different encryption types and cipher keys. Also, the program sets filters to create the multiple encryption or ML document or data object. Step 512 filters the document or data object. Step 514 encrypts the extracted data for each security level. These steps 510, 512 and 514 utilize many of the routines discussed above in connection with FIGS. 4 and 7, steps 232, 234, 236, 238, 240, 422 and 424. Step 516 recognizes that the secured document or data object may be stored for later use (with associated multiple decryption), published, distributed, or otherwise utilized to achieve the primary purpose of the document, i.e., to communicate information or to safely store security critical information. Step 518 permits the user, with the proper security clearance to retrieve the document or data object. Step 520 illustrates that the user must retrieve his or her cipher key to decode all or a portion of the ML encrypted document or data object. This step may be manual which engages the user to into certain codes or may be automatic such that the user's computer automatically, without operator input, decodes all or part of the document or data object. Step 522 decrypts the document pursuant to the user's security clearance. Step 524 recognizes that the user may review, re-publish, store, comment on, re-encrypt or otherwise deal and handle the full or partially decoded document or data object. The program ends or otherwise continues with other programs set forth herein. It should be noted that storage of the extracted data may be included in the flow path of the program in FIG. 9 is necessary.

The claims appended hereto are meant to cover modifications and changes within the scope and spirit of the present invention.

What is claimed is:

1. A method of securing data in a computer network and transparently establishing and managing the separation of user-based communities of interest based upon crypto-graphically separated, need to know security levels, said data having one or more security sensitive words, data objects, characters or icons, said computer network having a plurality of computers interconnected together, one of said plurality of computers designated as a data input computer and each of said plurality of computers having a memory therein, respective memories designated as a remainder store and respective extract stores in one or more computers of said plurality of computers, said user-based communities of interest representing a plurality of users having a corresponding plurality of security levels each with a respective security clearance and respective extract store, comprising:

filtering data input from said data input computer and extracting said security sensitive words, data objects, characters or icons from said data to obtain (a) subsets of extracted data and (b) remainder data;

storing said subsets of extracted data and said remainder data in said respective extract stores and said remainder store, respectively; and, permitting reconstruction of some or all of said data via one or more of said subsets of extracted data and remainder data only in the presence of a predetermined security clearance of said plurality of security levels.

2. A method as claimed in claim 1 wherein said cryptographically separated, need to know security levels correspond to respective ones of said plurality of security levels, the method including encrypting said subsets of extracted data with corresponding degrees of encryption associated with said plurality of security levels, and including decrypting, during the reconstruction, of some or all of said subsets of extracted data only in the presence of said respective security level of said plurality of security levels.

3. A method as claimed in claim 2 including utilizing placeholders in said remainder data representing non-reconstructed, extracted data during the reconstruction, said placeholders being one from the group of characters, icons, substitute words, data objects, underline and blank space.

4. A method as claimed in claim 3 wherein a plurality of placeholders are utilized, said placeholders including characters, icons, substitute words, data objects, underline and blank spaces grouped to represent each respective security level of said plurality of security levels.

5. A method as claimed in claim 1 including defining a plurality of filters, corresponding to said subsets of extracted data, prior to said filtering step.

6. A method as claimed in claim 1 including encrypting said subsets of extracted data and remainder data prior to storing.

7. A method as claimed in claim 6 wherein the step of permitting reconstruction includes decrypting said subsets of extracted data and remainder data.

8. A method as claimed in claim 1 wherein said plurality of computers are configured in a client-server network within which respective computers are designated by respective uniform resource locators (URLs) and said storing utilizes the URL for one or both of said extract store and said remainder store.

9. A method as claimed in claim 1 wherein said plurality of computers are configured in a client-server network within which respective computers are designated by respective uniform resource locators (URLs) and said data input computer operates as a client in said client-server network and one of said plurality of computers is designated as a server computer, the method including sending said extracted data from said data input computer to said server computer utilizing the respective URL.

10. A method as claimed in claim 9 wherein said step of permitting reconstruction includes downloading said extracted data from said server computer utilizing said respective URL.

11. A method as claimed in claim 1 wherein said plurality of computers are configured in a client-server network within which respective computers are designated by respective uniform resource locators (URLs) and said data input computer operates as a client in said client-server network and one of said plurality of computers is designated as a server computer, the method including sending said extracted data from said data input computer to the computer with said extract store utilizing the respective URL as controlled by said server computer.

12. A method as claimed in claim 10 including the step of encrypting and decrypting said remainder data and extracted data during sending and downloading.

13. A method as claimed in claim 11 including the step of encrypting said extracted data during sending and downloading and decrypting said extracted data during reconstruction.

14. A method as claimed in claim 1 wherein one computer of said plurality of computers includes a data display system with at least two separate but visually overlaid displays and at least two respective display interfaces, the step of reconstruction including displaying said extracted data on one of said at least two displays and displaying said remainder data on another of said at least two displays.

15. A method as claimed in claim 1 wherein one computer of said plurality of computers includes a display fed from video memory having a plurality of frame memory segments, and wherein the reconstruction step of the method includes interleaving extracted data and remainder data into respective ones of said plurality of frame memory segments.

16. A method as claimed in claim 1 including deleting said data input from said data input computer after the step of storing.

17. A method as claimed in claim 1 including mapping said storing of said subsets of extracted data with encryption.

18. A method as claimed in claim 1 wherein one of the steps of filtering, storing and permitting reconstruction utilize one of an inference engine, neural network and artificial intelligence process to filter, store and permit reconstruction.

19. A method as claimed in claim 1 wherein said security sensitive data objects are one or more portions of an audio file and the step of reconstruction utilizes extracted data representative of said one or more portions of said audio file.

20. A method as claimed in claim 4 including encrypting said remainder data prior to storing.

21. A method as claimed in claim 20 wherein the step of permitting reconstruction includes decrypting said remainder data.

22. A method as claimed in claim 21 wherein said plurality of computers are configured in a client-server network within which respective computers are designated by respective uniform resource locators (URLs) and said storing utilizes the URL for one or both of said extract store and said remainder store.

23. A method as claimed in claim 21 wherein said plurality of computers are configured in a client-server network within which respective computers are designated by respective uniform resource locators (URLs) and said data input computer operates as a client in said client-server network and one of said plurality of computers is designated as a server computer, the method including sending said extracted data from said data input computer to the computer with said extract store utilizing the respective URL as controlled by said server computer.

24. A method as claimed in claim 23 including the step of encrypting and decrypting said remainder data and extracted data during sending and downloading.

25. A method as claimed in claim 24 wherein one computer of said plurality of computers includes a data display system with at least two separate but visually overlaid displays and at least two respective display interfaces, the step of reconstruction including displaying said extracted data on one of said at least two displays and displaying said remainder data on another of said at least two displays.

26. A method as claimed in claim 24 wherein one computer of said plurality of computers includes a display fed from video memory having a plurality of frame memory segments, and wherein the reconstruction step of the method includes interleaving extracted data and remainder data into respective ones of said plurality of frame memory segments.

27. A method as claimed in claim 24 including deleting said data input from said data input computer after the step of storing.

28. A method as claimed in claim 27 including mapping said storing of said subsets of extracted data with encryption.

29. A computer readable medium containing programming instructions for securing data in a computer network and transparently establishing and managing the separation of user-based communities of interest based upon crypto-graphically separated, need to know security levels, said data having one or more security sensitive words, data objects, characters or icons, said computer network having a plurality of computers interconnected together, one of said plurality of computers designated as a data input computer and each of said plurality of computers having a memory therein, respective memories designated as a remainder store and respective extract stores in one or more computers of said plurality of computers, said user-based communities of interest representing a plurality of users having a corresponding plurality of security levels each with a respective security clearance and respective extract store, the programming instructions comprising:

filtering data input from said data input computer and extracting said security sensitive words, data objects, characters or icons from said data to obtain (a) subsets of extracted data and (b) remainder data;

storing said subsets of extracted data and said remainder data in said respective extract stores and said remainder store, respectively; and, permitting reconstruction of some or all of said data via one or more of said subsets of extracted data and remainder data only in the presence of a predetermined security clearance of said plurality of security levels.

30. A medium with programming instructions as claimed claim 29 wherein said crypto-graphically separated, need to know security levels correspond to respective ones of said plurality of security levels, the instructions including encrypting said subsets of extracted data with corresponding degrees of encryption associated with said plurality of security levels, and including decrypting, during the reconstruction, of some or all of said subsets of extracted data only in the presence of said respective security level of said plurality of security levels.

31. A medium with programming instructions as claimed claim 30 including utilizing placeholders in said remainder data representing non-reconstructed, extracted data during the reconstruction, said placeholders being one from the group of characters, icons, substitute words, data objects, underline and blank space.

32. A medium with programming instructions as claimed claim 31 wherein a plurality of placeholders are utilized, said placeholders including characters, icons, substitute words, data objects, underline and blank spaces grouped to represent each respective security level of said plurality of security levels.

33. A medium with programming instructions as claimed claim 29 wherein said plurality of computers are configured in a client-server network within which respective computers are designated by respective uniform resource locators (URLs) and the instructions for said storing utilizes the URL for one or both of said extract store and said remainder store.

34. A medium with programming instructions as claimed claim 29 wherein said plurality of computers are configured in a client-server network within which respective computers are designated by respective uniform resource locators (URLs) and said data input computer operates as a client in said client-server network and one of said plurality of computers is designated as a server computer, the instructions including sending said extracted data from said data input computer to the computer with said extract store utilizing the respective URL as controlled by said server computer.

35. A medium with programming instructions as claimed claim 34 including encrypting and decrypting said remainder data and extracted data during sending and downloading.

36. A medium with programming instructions as claimed claim 29 including deleting said data input from said data input computer after the step of storing.

37. A medium with programming instructions as claimed claim 29 including mapping said storing of said subsets of extracted data with encryption.

38. A medium with programming instructions as claimed claim 32 including encrypting said remainder data prior to storing.

39. A medium with programming instructions as claimed claim 38 wherein the step of permitting reconstruction includes decrypting said remainder data.

40. A medium with programming instructions as claimed claim 39 wherein said plurality of computers are configured in a client-server network within which respective computers are designated by respective uniform resource locators (URLs) and the instructions for said storing utilizes the URL for one or both of said extract store and said remainder store.

41. A medium with programming instructions as claimed claim 39 wherein said plurality of computers are configured in a client-server network within which respective computers are designated by respective uniform resource locators (URLs) and said data input computer operates as a client in said client-server network and one of said plurality of computers is designated as a server computer, the instructions including sending said extracted data from said data input computer to the computer with said extract store utilizing the respective URL as controlled by said server computer.

42. A medium with programming instructions as claimed claim 41 including encrypting and decrypting said remainder data and extracted data during sending and downloading.

43. A medium with programming instructions as claimed claim 42 including deleting said data input from said data input computer after the step of storing.

44. A medium with programming instructions as claimed claim 43 including mapping said storing of said subsets of extracted data with encryption.

45. A medium with programming instructions as claimed claim 29 wherein the programming instructions for one of the filtering, storing and permitting reconstruction utilize one of an inference engine, neural network and artificial intelligence process to filter, store and permit reconstruction.

46. A medium with programming instructions as claimed claim 29 wherein said security sensitive data objects are one or more portions of an audio file and the programming instructions for reconstruction utilizes extracted data representative of said one or more portions of said audio file.

47. An information processing system for securing data in a computer network and transparently establishing and managing the separation of user-based communities of interest based upon crypto-graphically separated, need to know security levels, said data having one or more security sensitive words, data objects, characters or icons, said computer network having a plurality of computers for a plurality of users all interconnected together, one of said plurality of computers designated as a data input computer and each of said plurality of computers having a memory therein, respective memories designated as a remainder store and respective extract stores in one or more computers of said plurality of computers, said user-based communities of interest representing said plurality of users having a corresponding plurality of security levels each with a respective security clearance and respective extract store, comprising:

means for filtering data input from said data input computer and extracting said security sensitive words, data objects, characters or icons from said data to obtain (a) subsets of extracted data and (b) remainder data;

means for storing said subsets of extracted data and said remainder data in said respective extract store and said remainder store, respectively; and, means for permitting reconstruction of some or all of said data via one or more of said subsets of extracted data and remainder data only in the presence of a predetermined security clearance of said plurality of security levels.

48. An information processing system as claimed in claim 47 wherein said crypto-graphically separated, need to know security levels correspond to respective ones of said plurality of security levels, the system including means for encrypting said subsets of extracted data with corresponding degrees of encryption associated with said plurality of security levels, and including means for decrypting, during the reconstruction, of some or all of said subsets of extracted data only in the presence of said respective security level of said plurality of security levels.

49. An information processing system as claimed in claim 48 including placeholders in said remainder data representing non-reconstructed, extracted data during the reconstruction, said placeholders being one from the group of characters, icons, substitute words, data objects, underline and blank space.

50. An information processing system as claimed in claim 49 including a plurality of placeholders including characters, icons, substitute words, data objects, underline and blank spaces grouped to represent each respective security level of said plurality of security levels.

51. An information processing system as claimed in claim 47 including means for defining a plurality of filters, corresponding to said subsets of extracted data, prior to said filtering step.

52. An information processing system as claimed in claim 47 including means for encrypting said subsets of extracted data and remainder data prior to storing.

53. An information processing system as claimed in claim 52 wherein said means for permitting reconstruction includes means for decrypting said subsets of extracted data and remainder data.

54. An information processing system as claimed in claim 47 wherein said plurality of computers are configured in a client-server network within which respective computers are designated by respective uniform resource locators (URLs) and said means for storing utilizes the URL for one or both of said extract store and said remainder store.

55. An information processing system as claimed in claim 47 wherein said plurality of computers are configured in a client-server network within which respective computers are designated by respective uniform resource locators (URLs) and said data input computer operates as a client in said client-server network and one of said plurality of computers is designated as a server computer, the system including means for sending said extracted data from said data input computer to the computer with said extract store utilizing the respective URL as controlled by said server computer.

56. An information processing system as claimed in claim 55 including means for encrypting and decrypting said remainder data and extracted data during sending and downloading.

57. An information processing system as claimed in claim 47 wherein one computer of said plurality of computers includes a data display system with at least two separate but visually overlaid displays and at least two respective display interfaces, the means for reconstruction including means for displaying said extracted data on one of said at least two displays and displaying said remainder data on another of said at least two displays.

58. An information processing system as claimed in claim 47 wherein one computer of said plurality of computers includes a display fed from video memory having a plurality of frame memory segments, and wherein said means for reconstruction includes means for interleaving extracted data and remainder data into respective ones of said plurality of frame memory segments.

59. An information processing system as claimed in claim 47 including means for deleting said data input from said data input computer after storing.

60. An information processing system as claimed in claim 47 including means for mapping the storing of said subsets of extracted data with encryption.

61. An information processing system as claimed in claim 50 including means for encrypting said remainder data prior to storing.

62. An information processing system as claimed in claim 61 wherein said means for reconstruction includes means for decrypting said remainder data.

63. An information processing system as claimed in claim 62 wherein said plurality of computers are configured in a client-server network within which respective computers are designated by respective uniform resource locators (URLs) and said means for storing utilizes the URL for one or both of said extract store and said remainder store.

64. An information processing system as claimed in claim 62 wherein said plurality of computers are configured in a client-server network within which respective computers are designated by respective uniform resource locators (URLs) and said data input computer operates as a client in said client-server network and one of said plurality of computers is designated as a server computer, the system including means for sending said extracted data from said data input computer to the computer with said extract store utilizing the respective URL as controlled by said server computer.

65. An information processing system as claimed in claim 64 including means for encrypting and decrypting said remainder data and extracted data during sending and downloading.

66. An information processing system as claimed in claim 65 wherein one computer of said plurality of computers includes a data display system with at least two separate but visually overlaid displays and at least two respective display interfaces, the means for reconstruction including means for displaying said extracted data on one of said at least two displays and displaying said remainder data on another of said at least two displays.

67. An information processing system as claimed in claim 65 wherein one computer of said plurality of computers includes a display fed from video memory having a plurality of frame memory segments, and the means for reconstruction includes means for interleaving extracted data and remainder data into respective ones of said plurality of frame memory segments.

68. An information processing system as claimed in claim 65 including means for deleting said data input from said data input computer after storing.

69. An information processing system as claimed in claim 68 including means for mapping the storing of said subsets of extracted data with encryption.

70. An information processing system as claimed in claim 47 wherein one of the means for filtering, means for storing and means for permitting reconstruction utilize one of an inference engine, neural network and artificial intelligence process to filter, store and permit reconstruction.

71. An information processing system as claimed in claim 47 wherein said security sensitive data objects are one or more portions of an audio file and said means for reconstruction utilizes extracted data representative of said one or more portions of said audio file.

72. A method of securing data and transparently managing the separation of user-based communities of interest based upon crypto-graphically separated, need to know security levels with a plurality of encryption types, said data having one or more security sensitive words, data objects, characters or icons, said user-based communities of interest representing a plurality of users having a corresponding plurality of security levels each with a respective security clearance and respective extract stores, comprising:

filtering data and extracting said security sensitive words, data objects, characters or icons from said data to obtain (a) subsets of extracted data for said respective extract stores and (b) remainder data;

encrypting said subsets of extracted data with said plurality of encryption types and storing extracted and remainder data in respective extract stores and remainder store; and, permitting reconstruction of some or all of said data via one or more of said subsets of encrypted extracted data and remainder data from said extract stores and remainder store only in the presence of a respective predetermined security clearance of said plurality of security levels.

73. A method of securing data and transparently managing the separation of user-based communities of interest based upon crypto-graphically separated, need to know security levels with a plurality of encryption types, said data having one or more security sensitive words, data objects, characters or icons, said user-based communities of interest representing a plurality of users having a corresponding plurality of security levels each with a respective security clearance and respective extract stores, comprising:

filtering data and extracting said security sensitive words, data objects, characters or icons from said data to obtain (a) subsets of extracted data for said respective extract stores and (b) remainder data;

encrypting said subsets of extracted data with said plurality of encryption types to obtain multiple level encryption and storing extracted and remainder data in respective extract stores and remainder store; and, decrypting all or portions of said data from said extract stores and remainder store with multiple level encryption only in the presence of a respective predetermined security clearance of said plurality of security levels.

* * * * *